June 10, 1952 W. R. SPILLER ET AL 2,599,591
CUTTING MACHINE
Filed March 13, 1946 9 Sheets-Sheet 8
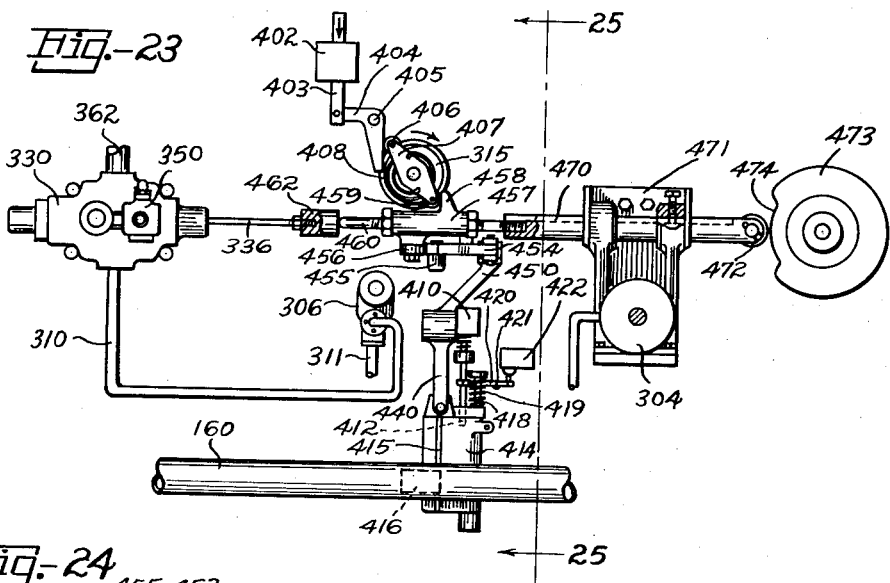
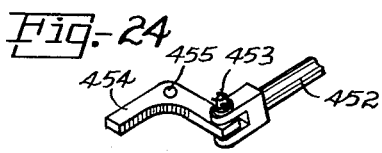
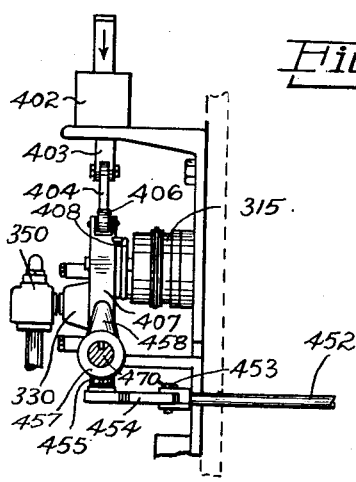
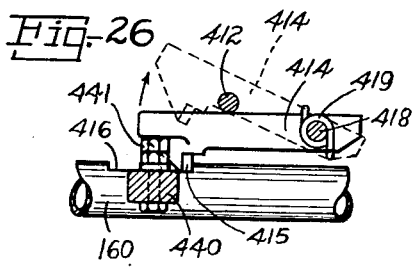
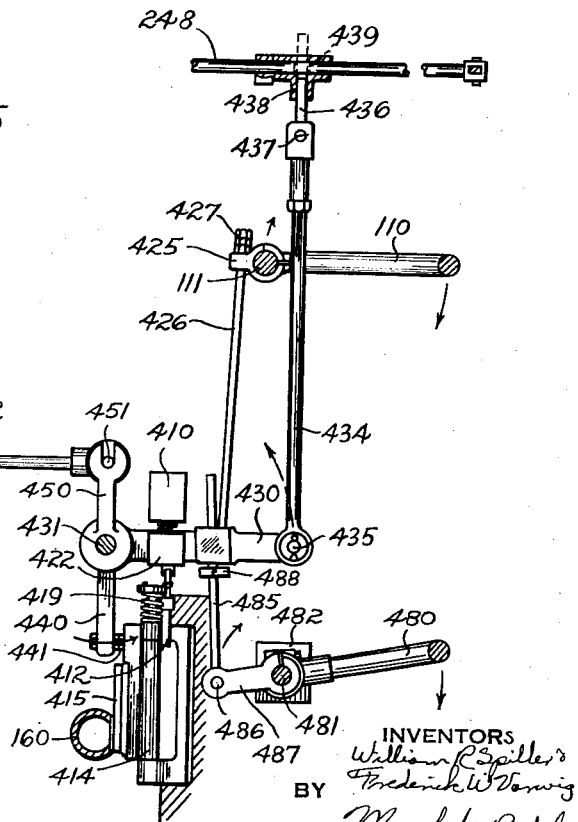
INVENTORS
William R. Spiller &
Frederick W. Vorwig
BY Marechal & Biebel
ATTORNEYS

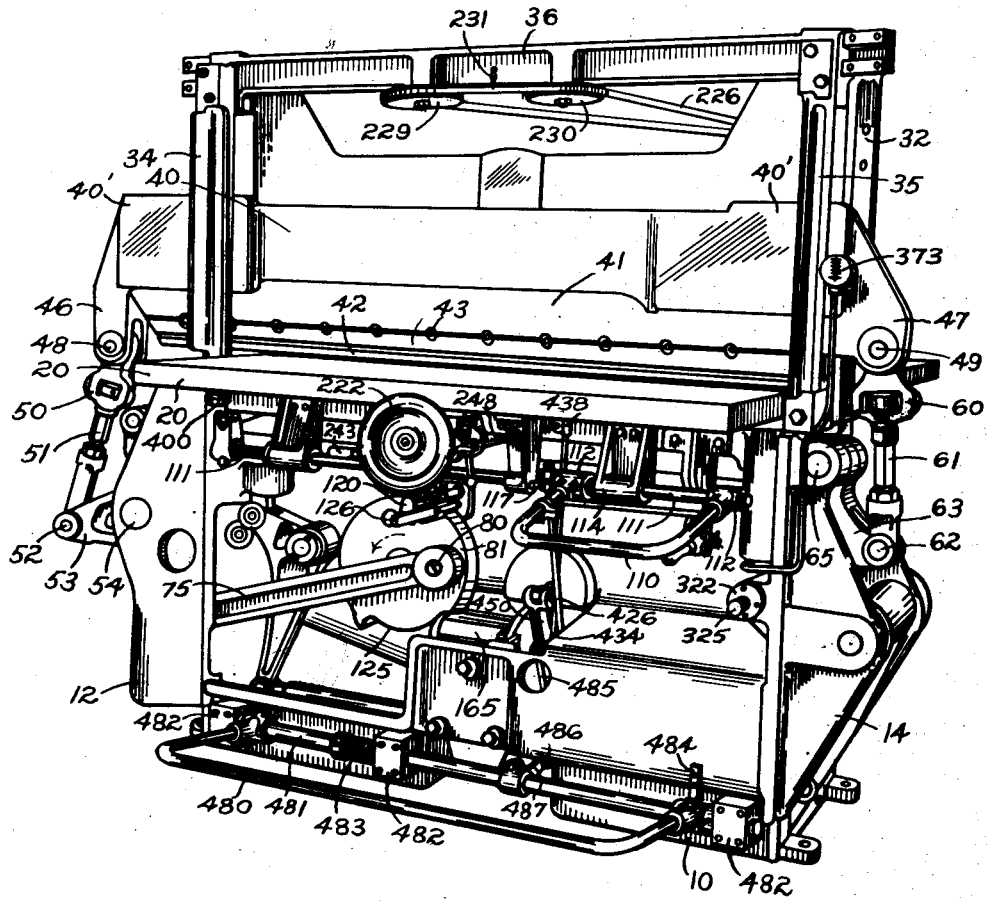

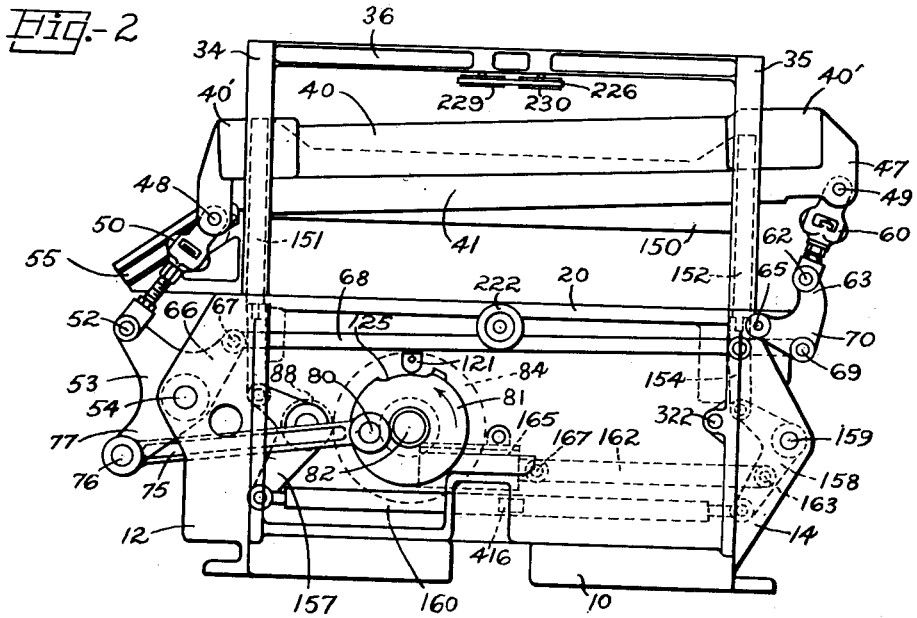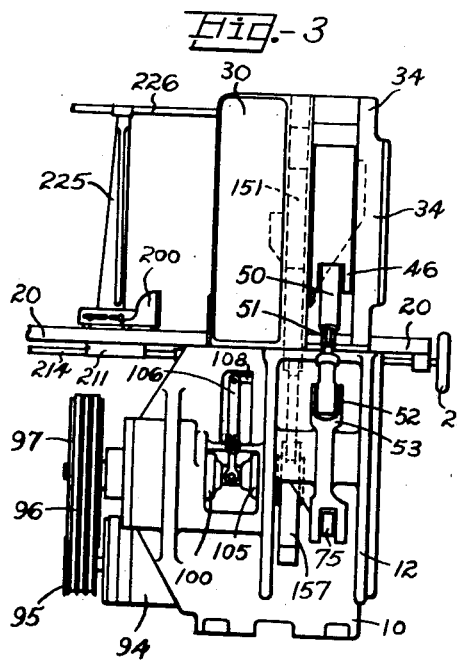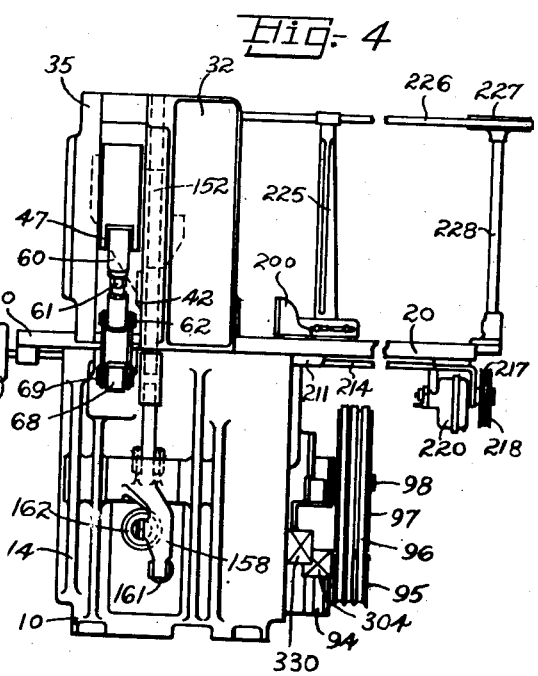

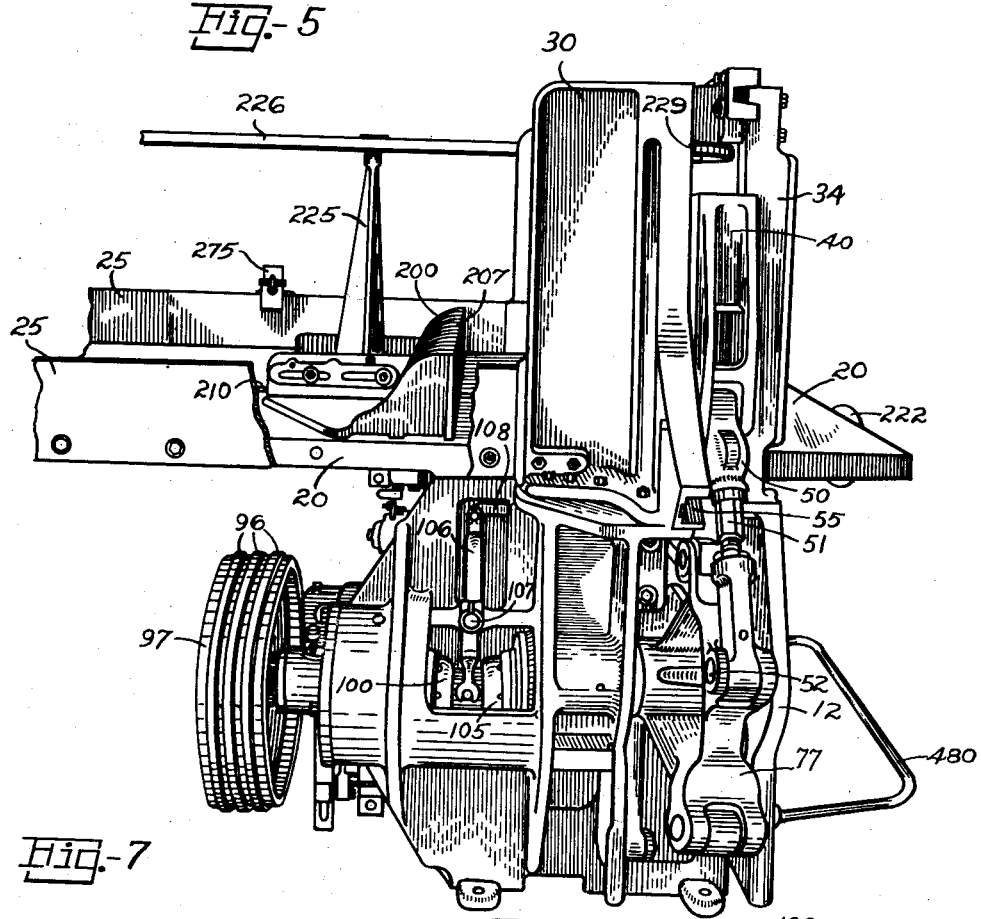
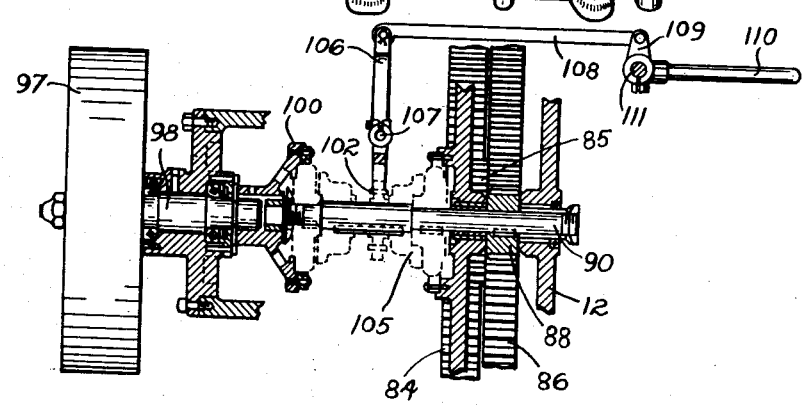

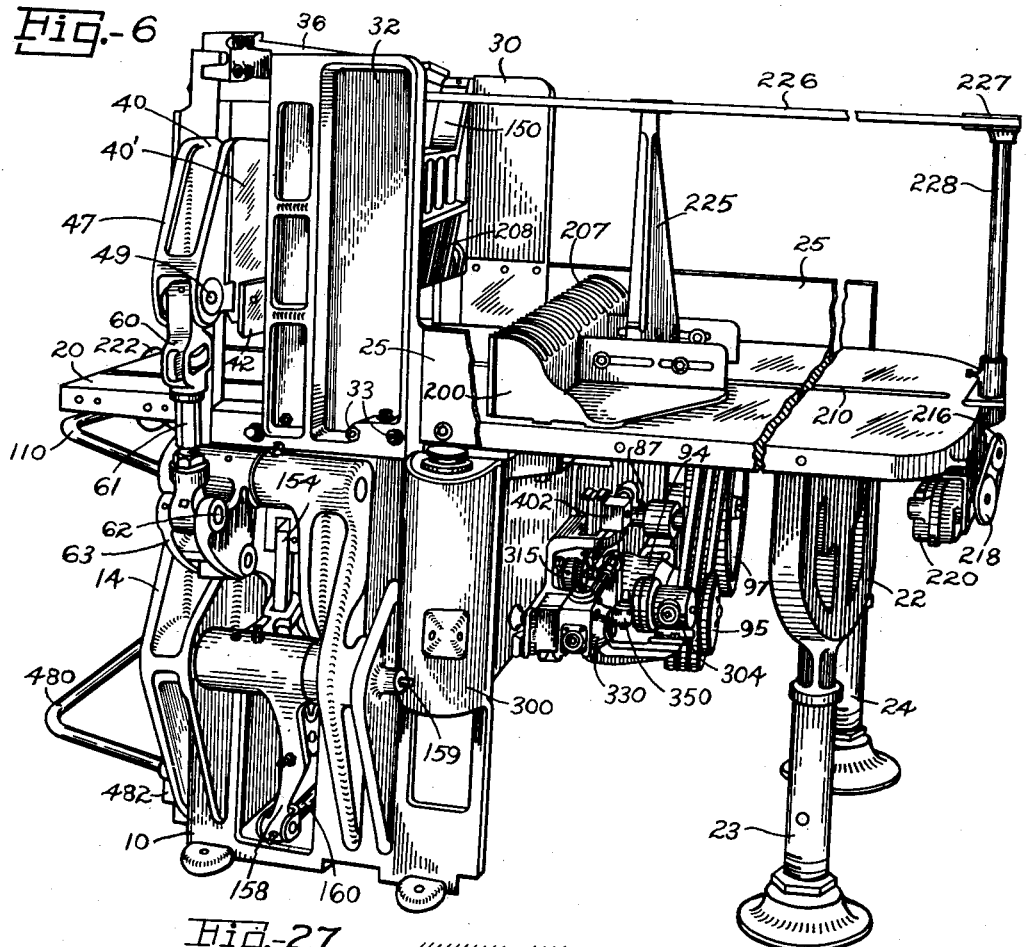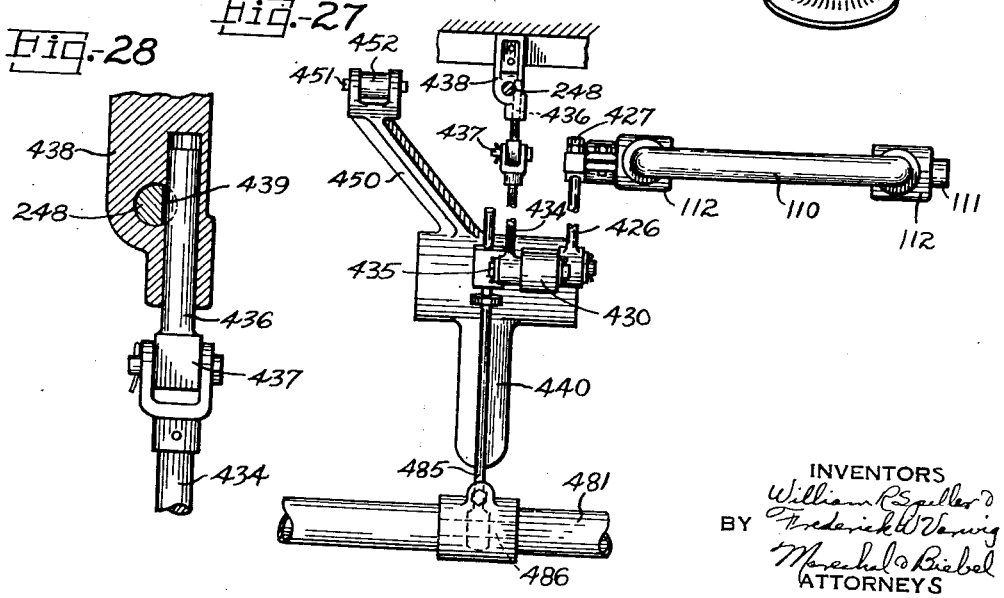

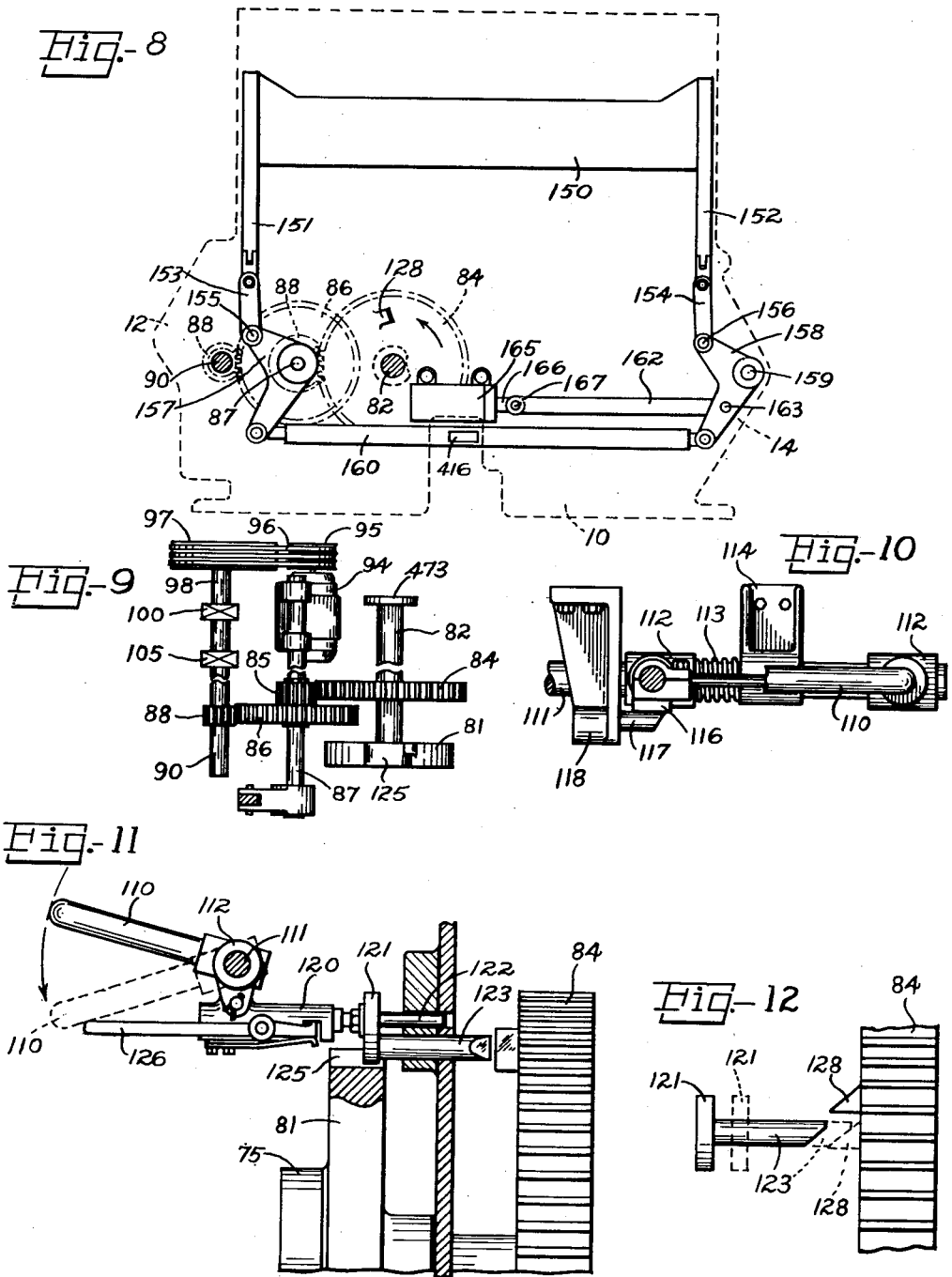

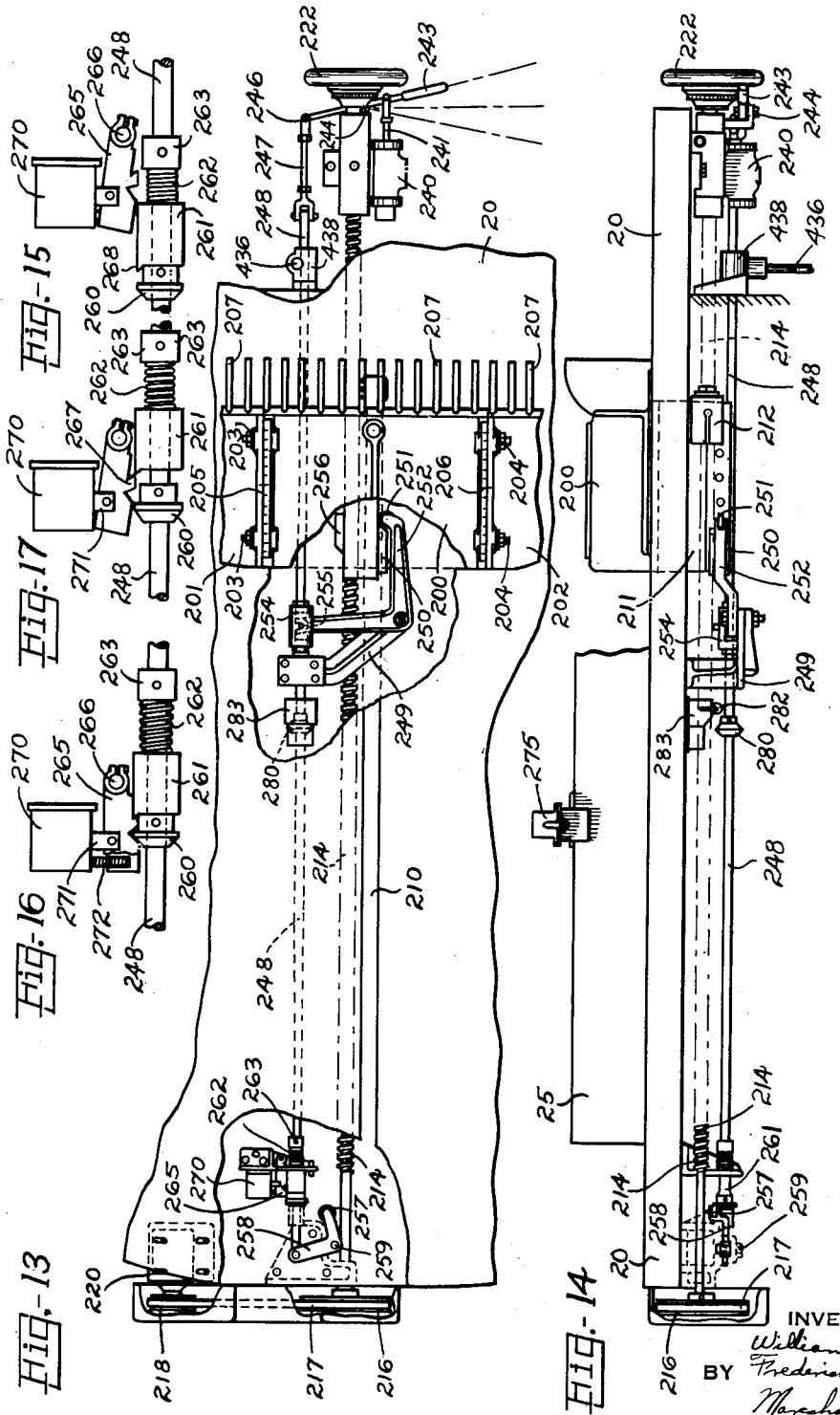

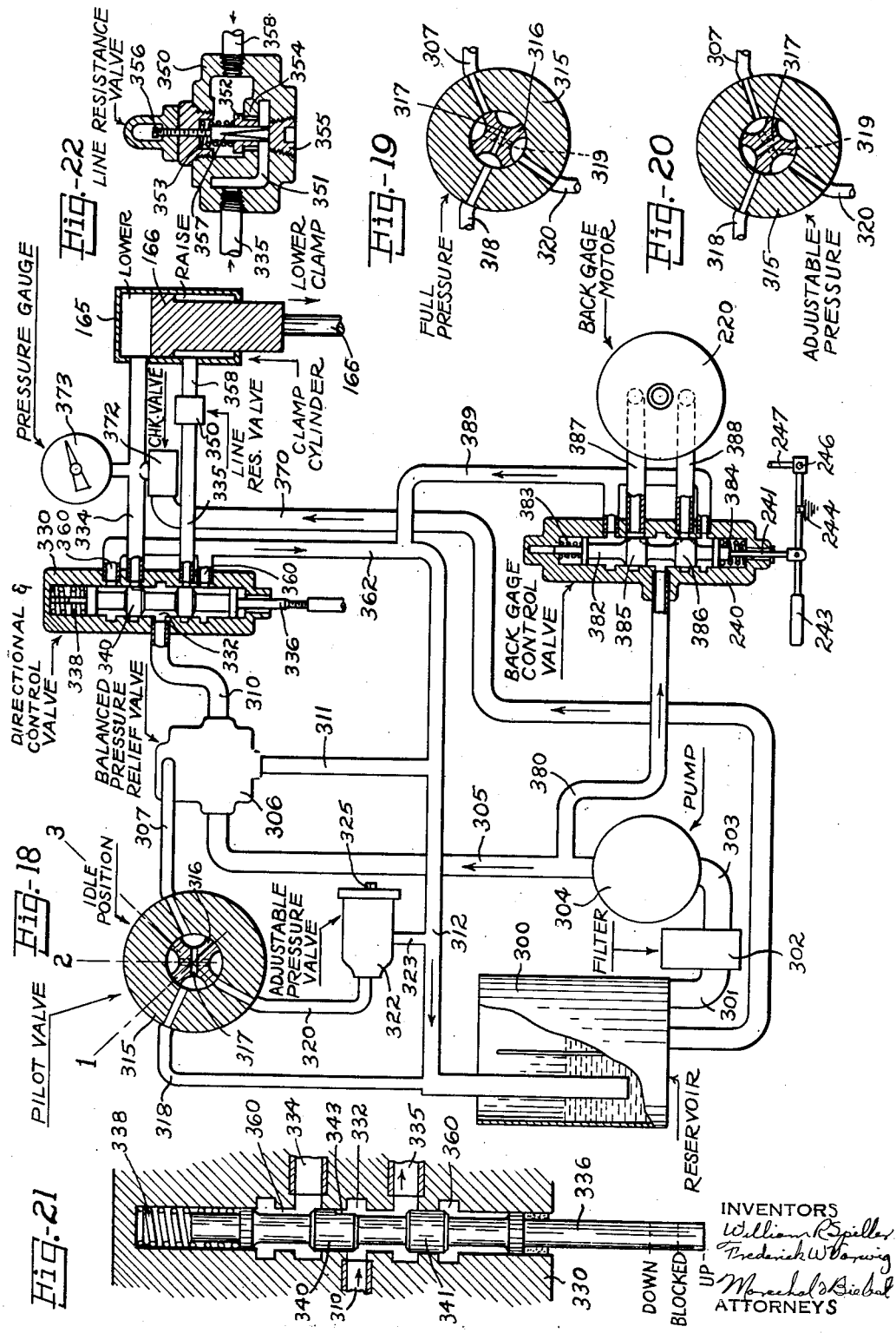

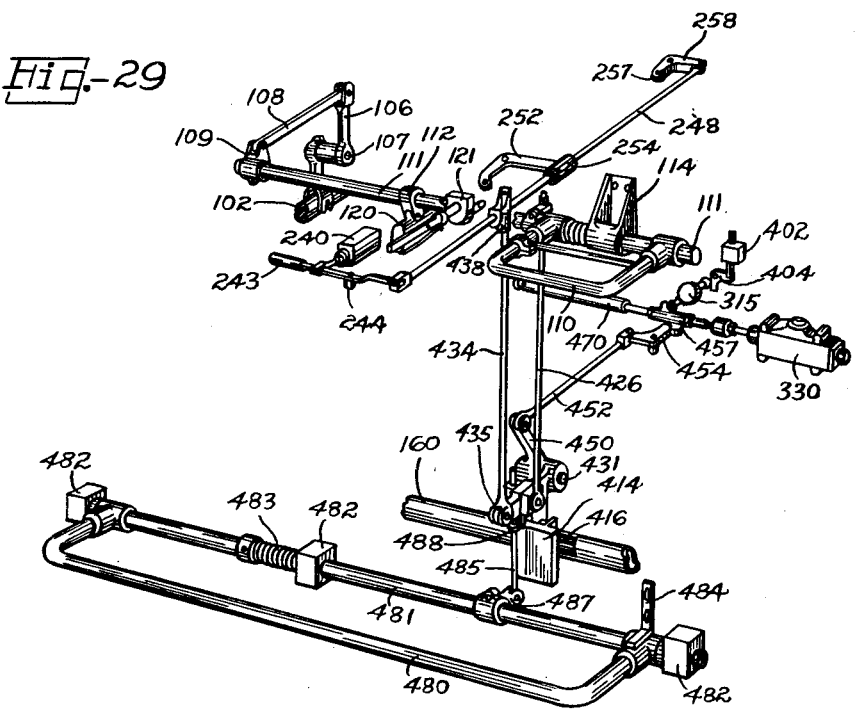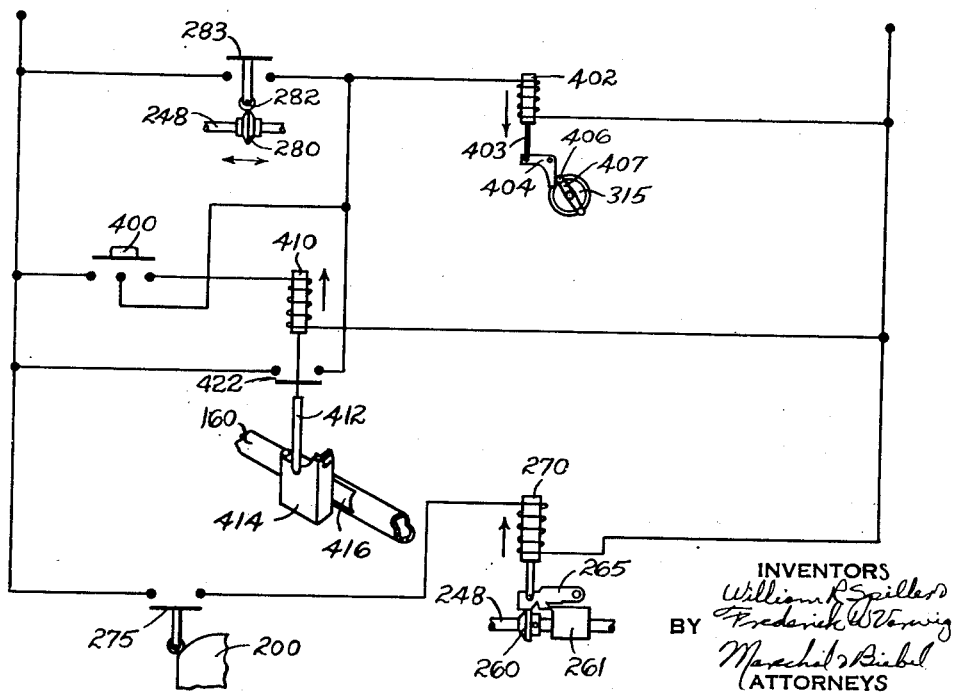

Patented June 10, 1952

2,599,591

UNITED STATES PATENT OFFICE 2,599,591

CUTTING MACHINE

William R. Spiller and Frederick W. Varwig, Dayton, Ohio, assignors to Harris-Seybold-Potter Company, Cleveland, Ohio, a corporation of Delaware Application March 13, 1946, Serial No. 654,157

33 Claims. (Cl. 164—54)

This invention relates to cutting machines and more particularly to machines for cutting paper and like material.

It is one of the objects of this invention to provide a cutting machine in which a cutting knife is mounted for reciprocating travel with respect to a work table and arranged to be actuated by a simple arrangement of links and levers so connected to the knife bar and operating in the plane of movement of the knife that the knife is substantially free of lateral thrust and thus operates with reduced wear and looseness or play and provides a more accurate cut.

It is also an object to provide a cutter in which the knife is reciprocated by mechanical connections and incorporating a clamp for the work material which is actuated by a hydraulic control giving a rapid and smooth clamping action without imposing excessive loads upon the source of power.

It is a further object to provide hydraulic clamping mechanism for a cutter in which a relatively small power source is utilized and which incorporates such controls that the clamp may be moved smoothly and rapidly to and from its clamping position under accurate control of the operator.

It is a further object to provide an hydraulic control system for the actuation of such a clamp which provides for the development of both high rates of movement of the clamp, and also the development of high clamping pressures, without however requiring the use of a power source of large size.

It is also an object to provide such an hydraulic system for a clamp in a cutting machine which makes possible the rapid travel of the clamp both in lowering and in raising from the clamping position, as well as the development of high clamping pressures, utilizing only a source of fluid pressure of relatively small capacity.

It is an additional object to provide a power operated clamp which can be actuated in coordinated relation with the knife or separately therefrom and in which the extent and direction of movement of the clamp and the pressure which it develops when in contact with the work are at all times predetermined and under the direct control of the operator.

It is a further object to provide for actuation of the clamp in conjunction with the reciprocating cycle of the knife, the clamp being caused to travel ahead of the knife so that it engages the work and applies a predetermined pressure thereto without shock in advance of the actual cutting operation, such pressure being maintained until after the knife has completed the cutting stroke, the clamp then releasing smoothly and returning rapidly to its fully raised position.

It is also an object to provide such a cutting mechanism having a back gage operating in coordinated and interlocking relation with the knife and clamp for receiving the work material and advancing it properly toward the cutting position.

It is a further object to provide a single hydraulic system for actuating both the back gage and the clamp in properly interlocked and coordinated relation to each other.

It is a still further object to provide for direct control by the operator of the movement of the back gage and to properly stop its travel at either limit of its movement or at a predetermined selected intermediate point on its backward travel.

Other objects and advantages will be apparent from the following description, the accompanying drawings and the appended claims.

In the drawings:

Fig. 1 is a perspective view from the front of a cutting machine constructed in accordance with the present invention;

Fig. 2 is a front elevational view of the machine in skeleton form showing the operating mechanism for actuating the knife and the clamp;

Figs. 3 and 4 are side elevational views from the left and right hand sides respectively of the machine;

Fig. 5 is a perspective view from the left hand side of the machine with certain of the parts being broken away;

Fig. 6 is a broken perspective view from the right hand side of the machine with certain parts being broken away;

Fig. 7 is a view in vertical section through the clutch and brake mechanism for driving the machine;

Fig. 8 is an elevational view in schematic arrangement showing the mechanism for operating the clamp;

Fig. 9 is a broken plan view showing the drive mechanism withdrawn from the frame of the machine;

Fig. 10 is a partial front elevational view showing the hand control for initiating the machine operation;

Fig. 11 is a vertical sectional view through the control mechanism for starting the operation of the machine;

Fig. 12 is a plan view of a portion of the mechanism which provides for non-repeat operation;

Fig. 13 is a plan view looking down upon the central portion of the machine with certain parts of the mechanism being broken away to show the control for the back gage;

Fig. 14 is a view in side elevation of the table and back gage operating mechanism;

Fig. 15 is a detail view showing the mechanism for control of the back gage movement in the position of adjustment corresponding to forward movement;

Figs. 16 and 17 are views of the same mechanism in the latched or rearward position, and in the release position, respectively;

Fig. 18 is a schematic lay-out showing the hydraulic system;

Figs. 19 and 20 are detail views showing two alternative positions of the pilot valve;

Fig. 21 is a view on an enlarged scale showing the directional control valve;

Fig. 22 is a sectional view on an enlarged scale through the valve which controls the speed of descent of the clamp;

Fig. 23 is a view in rear elevation of the fluid pressure control mechanism and the interlocking arrangement thereof;

Fig. 24 is a view in perspective of a detail of the mechanism shown in Fig. 23;

Fig. 25 is a sectional view on the line 25—25 of Fig. 23 further showing the arrangement of the interlocking mechanism;

Fig. 26 is a detail view showing the latch and the latch lock for retaining the clamp in its upper raised position;

Fig. 27 is a front elevation view of the mechanism for interlocking the hand control with the foot operating mechanism;

Fig. 28 is a view on an enlarged scale of a detail section showing Fig. 27 which provides for correlating the action of the back gage with the remainder of the mechanism;

Fig. 29 is a perspective view showing the assembled interlocking mechanism; and

Fig. 30 is a wiring diagram of the electrical controls used in the invention.

Construction of cutting mechanism

Referring to the drawings which disclose a preferred embodiment of the invention the machine comprises a base 10 having integral side frame members 12 and 14 respectively, these frame members being preferably formed as castings and suitably webbed as indicated to provide both additional strength and convenient surfaces for mounting various operating parts. A work table 20 is supported on the frame so formed, such table overhanging the frame at the forward or operator's side and providing a suitable support for receiving the work material.

The frame extends rearwardly and is supported at its end by a bracket 22 which rests upon adjustable pedestal feet 23, 24 so that the table can be properly supported and maintained in a level position. Side gage plates 25 are secured to the rearward portion of the table serving as lateral guides within which the work material is received.

Upright frame members 30, 32 are secured at either side of the table and immediately above the lower frames 12 and 14 respectively, the upper frames being secured in place by means of bolts such as shown at 33. Front guides 34, 35, are secured in spaced relation to frame members 30, 32 respectively, forming guide channels therebetween for guiding and directing the movement of the knife bar 40. A tie-piece 36 joins the guide members at their upper ends and extends across the entire width of the machine providing additional strength and rigidity.

The knife bar has pads or guide surfaces 40' formed thereon at either end which travel in the spaced guides formed between members 30 and 34 at one side and members 32 and 35 at the other side. The knife bar has a bevel at its lower side as shown at 41 within which is secured the cutting knife 42 by means of a series of bolts 43 recessed into the knife bar.

In accordance with the present invention the mechanism for actuating the knife is such that the forces are developed and applied substantially within the plane of movement of the knife by means of a simple arrangement of links and levers, giving a highly satisfactory knife movement and at the same time avoiding lateral thrust on the knife or the knife bar which would interfere with uniformity of cutting or result in unnecessary or excessive wear.

For this purpose downwardly extending arms 46, 47 are formed at opposite ends of the knife bar, these arms being apertured to receive pins 48, 49 therein, the pins as shown being mounted adjacent and approximately in the plane of the lower edge of the knife. The connections for the opposite ends of the knife are different because a double shear operation is desired, that is, it is desired to have the knife move downwardly and laterally during the cutting stroke, but with the opposite ends of the knife having a different initial elevation above the cutting table so that one end moves downwardly to a greater extent than the other end, the knife at the bottom of its stroke standing with its edge parallel with the work table and in proper contact with the usual cutting stick. This causes the knife to move across the work and with a slicing action which gives highly desirable cutting results.

This mechanism comprises a link 50 at the left hand side having pivotal engagement with pin 48. The link has an adjustable threaded connection 51 by means of which its effective length can be changed, and at its lower end is pivotally connected by means of pin 52 to one arm of a three-arm bell crank lever 53 which is pivotally mounted in the frame 12 for rotation about the axis of pin 54. A suitable projection at the rear side face of the knife bar travels in the guideway 55.

The opposite end of the knife bar is connected by means of link 60 to pin 49, such link having an adjustable threaded connection 61 by means of which its effective length can be varied. At its lower end link 60 is secured by pin 62 to one arm 63 of a two-arm bell crank pivotally supported in frame member 14 by means of pin 65. A second arm 66 of the three-arm bell crank receives a pin 67 which secures a cross bar 68 in place thereon, such bar having a pin connected as shown at 69 with the lower arm 70 of the two-arm bell crank. Thus as shown in Fig. 2 it will be evident that the two bell cranks are caused to swing in unison through the cross bar 68 which is subject to tension during the working stroke, each bell crank causing the actuation of a corresponding end of the knife bar through a different path of movement by providing for the bringing of its associated end of the bar into a level horizontal position at the limit of its down stroke of movement.

It will be evident that this simple arrangement of links and bell cranks provides for transmitting and applying the operating forces for actuating the knife entirely in a plane, that is, substantially the vertical plane in which the knife itself travels. Thus the entire mechanism causes the development of proper actuating forces in a simple and direct way to give a double shear action while reducing the lateral thrust on the knife bar to a minimum. This not only provides for more accurate operation of the knife bar but substantially reduces wear upon the pads and the cooperating guiding surfaces in the stationary frame. It will further be understood that because the pull from the links is applied substantially in the horizontal plane of the cutting edge of the knife, there is a further reduction in lateral thrust and this construction thus additionally contributes to proper operating conditions.

The operation of the knife bar is effected by means of a connecting rod 75 secured by means of pin 76 to the third arm 77 of the three-arm bell crank lever. The connecting rod is driven from a crank pin 80 carried on crank plate 81 suitably mounted in the lower frame of the machine. The drive mechanism is shown in plan in Fig. 9, where the main shaft 82 is shown as rotatably supporting the crank plate 81.

The drive is developed by means of a gear 84 secured to shaft 82 and operating from a pinion 85 which is secured to a large gear wheel 86, this gear assembly being loosely mounted on a stationary shaft 87. Gear wheel 86 is driven from a pinion 88 mounted on a driven shaft 90, such shaft being rotatably supported in the webs of the side frame member 12.

Power is supplied from a drive motor 94 located at the rear of the machine and for convenience supported from the rearwardly extending end of the fixed shaft 87. The motor has a drive pulley 95 over which operate a plurality of V-belts 96 which frictionally engage the outer circumference of a flywheel 97, transmitting driving torque thereto. Flywheel 97 is carried on shaft 98 which thus serves as a drive shaft, being coaxial with but spaced from the driven shaft 90.

A clutch and brake mechanism is provided for controlling the interconnection of the drive and driven shafts, this mechanism being shown in Fig. 7. Thus the clutch is shown at 100 comprising one or more clutch disks rotatable with drive shaft 98, and at least one disk secured to shaft 90. These disks are normally spaced from each other and are brought into driving relation with each other by means of a sliding collar 102. A brake 105 also of the dry disk type has one set of plates fixed to the frame 12 of the machine, and a movable plate fixed to shaft 90. In response to the operation of the clutch collar 102 in the opposite direction these disks are engaged with each to brake the rotation of the shaft. Preferably the clutch and the brake are similar in construction and are such that movement of the sliding clutch collar with either one causes the coupling of that portion thereof with the shaft 90, providing in the one case for the clutching of the drive shaft 98 thereto to rotate shaft 90, and in the other case for the coupling of the brake thereto to stop the rotation thereof. Movement of the clutch collar 102 is effected by means of lever 106 pivotally supported at 107 in the frame and operated by means of link 108 from the arm 109 of operating control handle 110 which is mounted for rotation about shaft 111 carried on the front of the frame in such position that the handle is readily available for convenient operation.

From the above it will be evident that the entire operating mechanism is mounted in a compact and convenient location, and that the reciprocating drive for actuating the knife bar is also located substantially in the vertical plane of the knife movement so that again there is substantially no application of lateral forces to produce objectionable wear or lack of uniformity in the cutting operation of the knife.

Referring to Figs. 10 and 11 means are provided for preventing accidental operation of the start handle 110 and requiring that the same be definitely moved to one side as a preliminary condition to the operation of the machine. For this purpose the handle is carried on slidable blocks 112 which are keyed to and slidable axially on shaft 111, a spring 113 acting against abutment 114 providing for normally moving the handle to the left as shown in Fig. 10. In this position block 116 on the lower side of the handle is in interfering position with a pin 117 fixed in a support 118 such that direct downward movement of the handle is prevented by this interference. In order to effect such downward movement it is necessary as a preliminary step to move the handle to the right to a clearance position and since this requires a definite act on the part of the operator, a safety factor is thus introduced.

Normally the downward swinging movement of handle 110 causes a corresponding movement through the action of an interlocking element 120 of an interlocking plate 121 which is slidably mounted in the frame member 14 of the base and which embodies a guide pin 122 and an operating pin 123. The plate 121 in the inoperative position stands in a notched-out portion 125 of the crank plate 81 thereby preventing accidental reverse or dropping movement of the knife when the machine is in the stationary position. An auxiliary release mechanism 126 is provided for disconnecting the direct control between handle 110 and the interlocking plate 121 in the event of the necessity arising for such independent operation. The construction and operation of this release mechanism is described more fully in Patent 2,350,540 assigned to the same assignee as this application.

In order to assure non-repeat operation and to disconnect the drive at the end of a stroke of operation, a cam 128 is provided on the inner face of the gear wheel 84 and in such angular position that as the stroke is substantially completed, this cam will engage the beveled face of pin 123, moving the same from the position shown in dotted lines in Fig. 21 to the full line position thereof, with a corresponding return of the operating handle 110 from its lowered operating position to its raised inoperative position, in which latter position the clutch is disconnected and the brake applied to stop the machine and hold the same in the operative position.

*Construction of clamp mechanism*

The clamp is shown in Figs. 2, 3, 4 and 8, and comprises a relatively narrow bar 150 which is mounted for vertical reciprocating movement in guideways formed in the upper frame members 30 and 32 respectively. These guideways are so formed that the clamp is located parallel with and immediately to the rear of the knife. Operation of the clamp is produced by means of downwardly extending arms 151, 152 to the lower ends of which are pivotally secured links 153, 154. Pins 155, 156 secure the links to the arms of bell crank levers 157, 158, respectively. Lever 157 is pivotally supported on the forward end of stationary shaft 87 while lever 158 is pivotally mounted on pin 159 suitably supported in the side frame 14.

A tie bar 160 secures the opposite ends of the bell cranks for corresponding movement, and power is applied through a link 162 pivotally attached at 163 to bell crank 158. A hydraulic cylinder 165 having a movable piston 166 therein is pivotally attached to the link 162 by means of pin 167. Through this mechanism actuating power is available to effect the power application of the clamp to hold the same in contact with the work material with a predetermined force, and likewise power is available for raising the clamp to its elevated position above the work material on the table. Also the mechanism provided for developing and applying the power for actuating the clamp is located beneath the work table and substantially in the vertical plane of travel of the clamp so that the mechanism provides for reciprocating travel of the clamp with substantially reduced lateral forces and thus greater accuracy without disturbance of the work, and reduced wear.

Construction of back gage

Referring now to Figs. 6, 13 and 14, the back gage is shown at 200, being preferably formed in separate sections including a main or central section and side sections 201 and 202 which are separately secured thereto by means of bolts 203, 204 which make possible the forward or rearward relative positioning of each two adjacent sections. As shown in Fig. 13 all three sections are adjusted for the same front alignment, and will be considered to function as a unit throughout the remaining description herein. Suitable index marks 205, 206 provide a scale showing the amount of offset where such adjustment is desired. The front face of the back gage is formed with fingers 207 which are spaced to interfit with fingers 208 at the rear of the clamp 150.

The work table 20 has a central longitudinally extending slot 210 through which a portion 211 of the back gage extends, such portion having a suitably threaded member 212 which engages a screw shaft 214 which extends substantially the full length of the table and which is rotated to effect the forward and reverse movement of the back gage assembly.

The shaft 214 is driven by means of a pulley 216 over which there travels a V-belt 217 driven from a drive pulley 218 which in turn is operated by means of a hydraulic motor 220 reversible as to direction of rotation, and suitably suspended from the lower side of the work table 20 at the rearward end thereof as shown in Fig. 6. A hand wheel 222 is secured to the screw shaft 214 on its front end and is thus accessible from the front of the machine for hand adjustment on the part of the operator when such is desired, the normal operation however being to operate the shaft through the fluid motor 220 to secure accurate and rapid movement of the back gage.

While a rapid travel of the back gage is desired during the time that a substantial movement thereof is being effected, it is also desirable to provide for a slow or inching traverse of the back gage when it is approaching a desired setting. The back gage carries an upright arm 225 which extends up substantially to the upper level of frame members 30, 32. The ends of a continuous flexible metal tape 226 are secured to arm 225, the tape traveling around a pulley 227 on post 228 at the rear end of the table, and at the front end thereof around two spaced guide members or pulleys 229 and 230 which are supported from the tie-piece 36. Tape 226 carries graduations thereon which in conjunction with a suitable fixed index 231 serve as a gage to determine the position of adjustment of the back gage at all times. A substantial length of the tape is thus visible at all times at the front of the machine. It will be evident from the arrangement as shown in Fig. 1 that the provision of the two spaced pulleys 229 and 230 with the index 231 located substantially centrally therebetween is advantageous in that it facilitates observation by the operator of a desired graduation as it travels around one or the other of the pulleys and well in advance of its actually reaching the index point. Thus the operator is forewarned of the approach of the desired graduation and has a proper opportunity to control the travel of the back gage, slowing it down so that it will move accurately up to the desired setting where it can be stopped.

Control of the movement of the back gage is effected by means of a control valve 240 (Fig. 13) which is located immediately to the rear of hand wheel 222 and which has a valve stem 241 normally urged to a central or neutral position by means of suitable springs incorporated in the valve mechanism. In this neutral position no fluid is supplied to the back gage motor 220 and the back gage remains stationary.

Movement of the valve stem is effected by means of a hand lever 243 pivotally secured thereto and to a fixed point 244 of the support, the hand lever being movable rearwardly to displace the valve from neutral in the direction to supply fluid to the motor 220 to cause the back gage to travel to the rear and providing a corresponding forward operation of the back gage when drawn forwardly from its neutral position.

It is desirable to provide for continuing reverse movement of the back gage when the lever is thrown to the reverse position so that the operator can merely set the lever in this position and allow the back gage to continue in motion to its rearmost limiting position, or to such other position as may be determined upon in advance, in this way leaving him free to remove the work and to place a fresh supply thereof upon the cutting table. Normally however it is desired to have the back gage move forwardly under the direct manual control of the operator.

To accomplish these functions the lever 243 has a pin connection at 246 with a link 247 which in turn is pivotally connected with a slide rod 248 extending throughout substantially the entire length of the table. The rod is supported at an intermediate point by means of a bracket 249.

In order to positively prevent over-travel of the back gage when it reaches either end of its normal travel, mechanical limit stops are provided which move the control lever 243 from either operative position to the neutral position when the operating limit of travel has been reached. Thus the base of the back gage below the table 20 carries a cam 250 which at the forward limit of travel of the gage is adapted to contact a roller 251 carried on a right angle arm 252 pivotally supported from bracket 249. The rod 248 is formed in two parts joined together by a coupling 254 which is adapted to engage a yoke 255 on arm 252. Examination of Fig. 13 will show that such cam produced movement of arm 252 will effect a travel of the rod 248 to the right which is in the proper direction to restore hand lever 243 from its forward to its neutral position thereby properly limiting the forward travel of the back gage.

The back gage base also carries a cam 256 which is adapted to engage roller 257 of lever 258 pivotally mounted at 259 to the rear of the table when the gage has reached the rearward limit of its travel. It will be evident that such engagement will result in the travel of rod 248 to the left, which likewise is in the direction to restore hand lever 243 from its backward to its neutral position, thus properly protecting the operation of the system in the event that the operator himself should fail to stop the operation of the motor at the proper point.

In order to provide means for continuing the back gage in the reverse travel direction until a predetermined limiting position is reached, the means shown in Figs. 15 to 17 is provided. As there shown the rod 248 has fixed thereto a cam member 260, a sleeve 261 being slidably mounted on the rod and normally urged against the cam 260 by means of a spring 262 acting against a fixed stop 263.

A latch member 265 is provided which is pivotally mounted at 266 on a fixed part of the mechanism, this latch having a latching tongue 267 adapted to be received in locking engagement between cam 260 and a forwardly projecting end 268 formed on sleeve 261. The latching member thus has a normal latched position in which the cam 260 is received and held against movement, but may also be withdrawn from latching position in response to the energization of a solenoid 270 which has an armature 271 connected to the latch and arranged to draw the same upwardly against the action of spring 272 to thus release the latch when properly energized. Energization is controlled by means of a limit switch 275 which is adjustably mounted upon one of the side members 25 of the table and arranged to be tripped when engaged by a portion of the back gage 200 when the latter in the course of its rearward travel passes beneath the limit switch.

The operation of this mechanism is as follows. When the control handle 243 is thrown to its forward position, rod 248 travels rearwardly or to the left and the sleeve 261 travels freely beneath the latch member 265, this being the condition illustrated in Fig. 15. It will thus be evident that the hand lever is not held in the forward position and upon release by the operator, will be returned to its neutral position by the centering springs.

When the hand lever is thrown to its backward position it moves the rod 248 to the right or forwardly and in this position latch member 265 drops into latching position between the cam 260 and the tongue 268 on sleeve 261, this being the position illustrated in Fig. 16. It will now be evident that release of the lever will have no effect because the rod 248 is latched in its displaced position and the back gage motor will thus continue to operate in the direction to cause continued backward travel of the back gage.

As the back gage moves rearwardly to the position determined by the setting of the limit switch 275, that circuit will be closed and solenoid 270 energized, with the result that the latch member 265 will be raised and withdrawn from its holding position whereupon the rod 248 is free to return to its neutral position under the action of the biasing springs under the valve member 240, or such other centering springs as may be used to supplement the action thereof. If limit switch 275 is not used, or in the event that it is desired to stop the rearward travel of the back gage by manual return of lever 243 to its neutral position, this is effected by movement of the rod 248 rearwardly or to the left, either by hand or in response to the engagement of cam 256 and roller 258 at the rearward limit of travel. In either event release of the latch is effected in the manner illustrated in Fig. 17, in which the inclined surface of cam 260 is shown as raising the latch while tongue 267 holds the sleeve 261 against movement, compressing the spring 262. The parts are shown in the position just prior to full release, following which the rod is free to be returned to its neutral position under the action of the centering springs and the movement of the back gage thereupon stops.

In order to provide for development of a proper control and operating pressure whenever power actuation of the back gage is desired, rod 248 carries a beveled cam 280 (Fig. 14) at a suitable point, the cam having oppositely sloping faces forming a narrow central raised portion which in the neutral position of the control lever 243 stands opposite and in contact with a roller 282 of a micro-switch 283 suitably fixed to the frame. It will thus be evident that upon movement of the hand lever in either direction away from its neutral position, the high point of cam 280 will move away from roller 282, and thereby allow the micro-switch to close its contacts. This establishes a control in the hydraulic circuit as will be described hereinafter which provides for developing full operating pressure in the fluid system, the pressure being correspondingly reduced upon return of the control lever to neutral position.

Hydraulic system

As already described, the reciprocating knife is arranged to be mechanically actuated during its working stroke while the clamp for clamping the work material and the back gage are operated by hydraulic motive power. This has been found to produce a satisfactory and highly advantageous result since the desirable features of the direct drive for the knife are attained while at the same time securing the flexibility and ease of control of the hydraulic system for operating both the clamp and the back gage.

In addition the proper operation of all elements of the machine is secured in correlated relation to each other and without requiring the application or development at any time of excessive amounts of power. Thus a relatively small power source provides adequately for the desired operations and both the initial costs and the operating losses are maintained relatively low.

Referring more particularly to the operation of the clamp, it is desirable to provide for movement of the clamp either in conjunction with the normal stroke of the knife or separately therefrom under manual control, and to provide in the latter case for application of the clamp with a proper holding force and release thereof with the return of the clamp to its raised position while maintaining the clamp under continuous manual control. When actuated during the reciprocating stroke of the knife, it is important to provide for travel of the clamp in advance of the knife so that it will move quickly into its work engaging position and establish a proper clamping pressure without shock or displacement of the pile of work material. It is also important to provide for selecting the clamping pressure, and to provide for variation of that pressure as desired to provide for clamping different materials on the table.

In accordance with the present invention hydraulic mechanism is provided for affording a rapid and smooth travel of the clamp both under manual and under automatic control. In the latter case in response to actuation of the hand control for initiating a cutting cycle, the clamp is first lowered rapidly into engagement with the work, and a predetermined holding or clamping pressure is then developed to hold the work during the entire time that the cutting stroke is being effected, and until the knife has withdrawn above the work material on the return stroke. Thereafter the clamp is returned to its raised position where it is locked and so retained until a subsequent operation.

These successive steps require application of different degrees of force, and this in turn necessitates the development of different pressure conditions in the hydraulic system. It is therefore a part of the present invention to provide for developing proper pressure conditions throughout the entire operation of the system and for making such pressure properly available for the desired clamping operations while being at all times under proper control of the operator and properly correlated with the operation of the system.

It is further important to provide for the development of a total clamping pressure when the clamp is in engagement with the work which will be sufficiently high to meet the maximum requirements of the work. While this can be accomplished with the provision of a piston of large area, the normal arrangement of such a system would involve either an excessive time delay in the filling of such a large cylinder space, or alternatively, the use of a fluid pump and drive motor of large capacity to fill such space with the necessary speed. If a motor and pump of small size only are utilized, then the normal rate of supply of fluid through the pump is so limited that a retarded travel of the clamp results and it is not feasible to have it move faster than the knife at the beginning of the work stroke, to establish its clamping relation with the work material before the knife descends to the cutting position. On the other hand if the pump and motor are of sufficient capacity to provide the rapid supply of pressure fluid which will permit the desired high rate of travel of the clamp toward its clamping position, this necessarily entails a substantially increased initial installation of both pump and motor, as well as involving materially greater operating losses because of the presence of such large size units and the corresponding increased loss of power during operation.

It is therefore one of the important advantages of the present invention that the hydraulic system utilized is such as to provide for the rapid downward travel of the clamp at a rate sufficiently greater than the travel of the knife such that the clamp will reach its clamping position in advance of the knife, without however disturbing the work material when it comes in contact therewith, and be in such position that a proper clamping pressure will have been developed by the time the knife begins its cutting stroke. This is accomplished with the use of a large capacity cylinder and piston supplied at a rapid rate with fluid by a relatively small capacity motor and pump, which thus entails only limited initial cost and weight and which are correspondingly efficient in operation. Thereafter the clamp is raised by application of full fluid pressure to a piston surface which is relatively much smaller in area, providing for rapid filling and hence rapid raising of the clamp to its inoperative position where it is locked in place.

In addition the same hydraulic means provides for developing power for the actuation of the back gage, the operation of the back gage being suitably correlated and interlocked with the operation of the clamp and the knife so that the two operations are mutually exclusive. That is, when the back gage is being used, an interlock is provided which prevents operation of either the clamp alone, or the clamp and the knife. Conversely, when the clamp is actuated either alone or in conjunction with the operation of the knife, the back gage cannot be operated. The control provides for developing a full pressure condition in the fluid system when the back gage is in operation and selective application of the pressure fluid is made by manual control to provide for both forward and backward movement of the back gage.

The fluid system is shown schematically in Fig. 18 in which a reservoir chamber is indicated at 300 from which a supply line 301 leads to a filter 302 and from there through line 303 to the pump 304. The pump is suitably driven by an electric motor, preferably the same motor which drives the knife and which is shown at 94, the motor preferably being arranged to drive the pump continuously.

A supply line 305 leads from the discharge side of the pump into a balanced pressure relief valve 306. This valve has a pressure balanced piston the position of which is controlled in response to the pressure in auxiliary line 307 and provides for delivery of fluid to a discharge line 310 at a predetermined maximum pressure condition, the excess flow of fluid being discharged through return line 311 which opens into a header 312 flowing directly back to the reservoir chamber 300. As a specific example, valve 306 may be a Vickers valve known as Type C-167-B. Control of the pressure in line 307 and hence of the maximum pressure at which the relief valve 306 will discharge is established with a limited flow through line 307, comprising only a small fraction of the total flow delivered through supply line 305. A pilot valve 315 is included in the control line 307, the pilot valve having a rotatable valve spool which is ported as illustrated in Figs. 18, 19 and 20 to provide the following operations.

In the position of the pilot valve illustrated in Fig. 18 it will be evident that a free passage is provided through line 307, the cross port 317 and return line 318 which leads into header 312. When the pilot valve is so positioned, therefore, there is no pressure in line 307 and hence the pressure relief valve 306 will be set to relieve the flow at a low or substantially no pressure, delivering the main flow directly into return line 311 so that the system in this condition will merely circulate the fluid without doing work, and hence with a minimum of load being imposed upon the pump.

In the second or full pressure position, shown in Fig. 19, the passage through line 307 is blocked and thus a maximum pressure condition is established in that line and as a result the valve 306 will open the discharge passage through the return line 311 only when the pressure rises in excess of a maximum limiting value. This is the condition which is established to provide for the lifting of the clamp and also when the back gage motor is being operated, these being conditions in which full or maximum pressure is desired.

The third or adjustable pressure position of the pilot valve is shown in Fig. 20 in which position a fluid passage is established through line 307, port 319 of the valve body which is below and separate from port 317, and line 320 which leads to an adjustable pressure valve 322 the discharge of which is returned through line 323 to header 312. Valve 322 may conveniently be a Vickers type C-171-B and has a manual adjustment 325 accessible from the front of the machine which can be set for a predetermined pressure condition intermediate zero pressure and the maximum pressure established in the system. Assuming for example that this manually adjustable valve is set for a pressure equal to half the maximum pressure, and with the pilot valve 315 in this variable pressure position, a flow of a small portion of the fluid delivered by the pump takes place through adjustable pressure valve 322 and back to the reservoir, establishing a pressure of the predetermined desired value in line 307 which in turn effects the setting of the valve 306 to relieve at a corresponding pressure. It is this adjustable pressure setting of the pilot valve which is established during the actual clamping operating in order to provide for developing a predetermined clamping pressure to be effective for the clamping of the work.

Supply of pressure fluid takes place through supply line 310 to a directional control valve 330 which provides for proper application of the fluid to control the operation of the clamp by control of the supply of pressure fluid to the clamp operating cylinder 165. Supply line 310 delivers fluid to a central chamber 332 of the valve from which it may flow to one of two supply pipes 334 or 335, depending upon the uncovering of a flow passage as the result of the movement of the valve stem 336. This valve stem is under control of the operator, and is normally biased by means of spring 338 in the downward direction as shown in Fig. 21 which is in the direction to establish a flow through pipe 335 applying fluid to raise the clamp. The stem carries two lands 340 and 341 which control respectively the supply of fluid to pipes 334 and 335. While land 341 is preferably substantially cylindrical, land 340 has a tapered or cut-away portion 343 which provides for a throttling opening in the initial upward movement of the valve stem to establish communication with pipe 334. Supply of fluid to the pipe 334 acts in the direction to cause the application of pressure thereto to establish a clamping pressure upon the work material. The biasing of the valve stem 336 as above described, therefore, is in the direction which provides for normally maintaining the flow passage open through line 335, thus supplying fluid in the direction operating to raise the clamp.

Pipe 335 which supplies fluid in the direction acting to cause a raising of the clamp contains an additional valve marked 350 which is identified as a line resistance valve. A detail showing of this valve is contained in Fig. 22 from which it will be seen that the pipe 335 leads into an inner chamber 351 which is normally controlled by a check valve 352 spring urged by means of spring 353 to a seating position upon the valve 354. A clean out plug 355 provides access to the interior of the valve when necessary. The valve 352 receives internally a central stem 356 which has a tapered slot 357 therein, the stem being adjustably carried in the valve housing and its upper end being accessible so that it can be raised or lowered relative to valve 352 to provide for a greater or lesser free opening passage through the valve.

From this description it will be evident that flow of fluid to the right as shown in Fig. 22, i. e., in the direction to effect the raising of the clamp, will merely lift the check valve 352 from its seat 354 and allow substantially unimpeded flow of the fluid through the valve and into auxiliary conduit 358 from which it is supplied directly to the lower side of the piston head 166 within the clamp operating cylinder 165. However upon return flow of fluid in the reverse direction as required when the clamp is lowered, check valve 352 seats and thus closes the free passage, the only passage then available being that provided by the exposed slotted opening 357 in the stem 356. Since this is relatively small, a definite resistance to the flow is provided and the return flow therefore takes place at a definite and predetermined rate which will provide for the rapid though safe downward travel of the clamp toward and into clamping engagement with the work material. It will be evident that such rate can be readily predetermined by the proper setting of stem 356 to give a rate of descent of the clamp as desired. The fluid returns through pipe 335, communicating the valve passages 360 in valve 330 and back through return line 362 to header 312.

As shown in Fig. 18, the area on the upper side of piston 166 is substantially greater than that on the lower side, a satisfactory condition in this case having been found to be approximately ten square inches as compared to one square inch. While this provides for developing a high total pressure to be effective for holding the clamp in clamping relation with the work, it also requires a relatively high rate of supply of fluid above the piston 166, in order to provide for a desirably rapid rate of downward travel of the clamp. If a pump and motor are provided of sufficient capacity to supply this flow at the necessary high rate through the normal flow passage, it is evident that such pump will have to be of very substantial size, merely in order to supply this quantity of fluid at the desired rate, although at that time there is substantially no work being done by the fluid since the clamp is falling by gravity and there is therefore no pressure in the system. In order to maintain a small and highly efficient pump and motor system, while also providing for the desired rapid travel of the clamp to its lower position, an auxiliary supply conduit is provided as shown at 370, such conduit leading directly from the reservoir chamber 300, and without passage through the pump 304 or control valve mechanism 306, 330 heretofore described. This conduit can be sufficiently large to handle whatever volume of flow is necessary, since the flow takes place in response to the lowering of the internal pressure in the fluid system below atmospheric in response to the falling of the clamp under the action of gravity. A check valve 312 is provided immediately ahead of the connection of this conduit to pipe 334, the check valve providing uninterrupted flow into line 334 while preventing return flow therefrom during the time that a pressure condition is developed in the cylinder. Also as shown a pressure gage 313 is preferably provided for indicating the pressure existing in pipe 334 and hence the unit pressure effective upon the piston 166 during the clamping operation.

In operation, with the pump and motor functioning, and in advance of the manual control of the clamp, the directional valve 330 is biased in the downward direction shown in Figs. 18 and 21 to provide for continuing supply of fluid through pipe 335, line resistance valve 350 and into the space below piston 166 so that the clamp is normally urged toward its upper or raised position. It will likewise be understood that during this time the pilot valve 315 is in its blocked or maximum pressure position and thus full fluid pressure is available and made effective beneath the head of piston 166, acting in the direction to raise the clamp.

Upon the operation of the manual control to provide for movement of the clamp, valve stem 336 is moved against the action of biasing spring 338 in a direction to establish a fluid flow path from supply 310 to pipe 334, a discharge passage meanwhile being established from line 335 to the discharge conduit 362. Fluid pressure being now withdrawn from the lower side of piston 166 and a path established for the return flow of fluid therefrom, the clamp immediately begins to fall, at a rate which is determined by the setting of the line resistance valve 350, being the rate at which the fluid beneath the piston 166 can escape through slotted opening 357 of valve 350 to be returned to the reservoir. This valve is suitably adjusted to provide for rapid descent of the clamp while at the same time preventing shock or the possibility of disturbing the work material when it is engaged by the clamp. Nevertheless this rate of fall is substantially greater than the rate at which fluid could be supplied through the pump to the large cylinder space above piston 166, and as a result this additional fluid is drawn through auxiliary conduit 370, without placing any load upon the motor or pump. Downward travel of the clamp is at all times under manual control and can be stopped or reversed with speed and precision by proper manual operation of the control valve 330, the tapered land 343 providing for accuracy of control when the valve is merely cracked.

When the clamp is fully lowered, fluid is no longer drawn through conduit 370, but the cylinder space being filled with fluid, a pressure is immediately built up in the cylinder space above the piston 166 as the result of the fluid supplied from the discharge side of the pump. It will be evident that with the space above piston 166 already filled with fluid, it requires only a limited additional supply to establish a high pressure condition, and the proper pressure is thus quickly established and maintained thus providing a smooth clamping action without attendant shock.

The same control operation which provided for the movement of the directional valve 330 to the upper position also effected the adjustment of the pilot valve 315 to its adjustable pressure position with the result that by the time the clamp reaches its lowered position the pilot valve has been set for a definite pressure condition, i. e., the pressure established by the manual control 325, so that this predetermined pressure is quickly established, after which the pressure relief valve 306 maintains that predetermined pressure, returning all excess fluid to the header 312 and back to the reservoir chamber. The clamp is thus held in proper clamping position with a predetermined pressure before the knife has traveled far enough to actually engage the work material, and such pressure is maintained throughout the cutting stroke.

At the end of the cutting stroke the directional control 330 is again operated to effect the raising of the clamp, the pilot valve 315 is restored to its blocked or full pressure position and pressure relief valve 306 is thus again caused to release at maximum pressure in the system. Fluid flows through line 335, through line resistance valve 350 lifting valve 352 from its seat, and flows into the relatively small pressure space below piston 166. Because this space is small a rapid filling thereof takes place causing the rapid lifting of the clamp, so that at the proper point in the cycle, substantially at the end of the stroke of the knife, the clamp is withdrawn from the work and raised to its upper or inoperative position.

In a practical embodiment it is found that with the approximate piston sizes referred to, and utilizing a maximum fluid pressure of about 1000 pounds per square inch, complete downward travel of the clamp is effected within about 0.5 seconds, approximately the same length of time being required to cause the complete raising of the clamp. This is sufficiently short in relation to an operating cycle of the knife of about 1.5 seconds to provide for complete clamping engagement before the knife moves far enough to contact the work. A maximum clamping pressure can be developed of approximately 10,000 pounds, and the entire system is supplied from a pump having a capacity or rating of about 5.6 gallons per minute.

The same fluid system is also utilized for the operation of the back gage motor, and for this purpose a line 380 leads from the discharge side of the pump to the center of the control valve 240 previously referred to. This valve contains a stem 241 secured to the valve spool 382, the spool being normally centered in the valve body by means of the two springs 383, 384. Suitable lands 385, 386 control the supply of fluid from the central pressure chamber to one or the other of the supply lines 387, 388 which supply the fluid selectively to the back gage motor 220 to cause rotation thereof in one direction or the other. The return fluid is discharged through line 389 back through the header 312.

Preferably each of lands 385, 386 is relieved on the pressure side to provide for a throttling flow of fluid from the central pressure chamber to one or the other of the supply lines 387, 388 when the valve is moved slightly from its neutral position, thereby providing for a controlled slow power operation of the back gage in either direction under the control of the operator. Thus the valve provides a controlled range of speeds of operation of the back gage. Further the lands are also relieved on the opposite or discharge sides to allow some flow to take place from the back gage motor when the back gage is operated entirely manually from hand wheel 222, thus avoiding blocking the movement of the back gage. The controls are such that whenever the back gage motor is in use, the pilot valve 315 is positioned in the blocked or full pressure position which provides for developing up to the maximum pressure in the line 380 from the pump so that proper pressure will be available for the operation of the back gage motor under the selective control of hand lever 243 as already described.

Interlocking and pressure control system

Mechanism is provided for properly interlocking and correlating the various machine operations to provide protection both for the operator and for the machine itself, and likewise to provide for the development of proper operating pressures in the hydraulic system for the various steps in the operation. It is desirable to provide a start button or control which is separate or spaced from the normal handle which controls the operation of the machine, thus preferably requiring the operator to use both hands in order to initiate operation of the machine so that he will not accidentally allow his hands to get in the path of the downwardly travelling knife or clamp.

For this purpose a start button 400 is mounted at a convenient position beneath the work table 20 and preferably at the left-hand side thereof as shown in Fig. 1, in which position it is out of the normal path of handling of the work material; but in such position as to require a definite manual operation separate from the operation for starting the machine and preferably requiring the other or left-hand of the operator to be in a safe position at the beginning of a cycle of the machine operation.

When the start button 400 is depressed, a control circuit is closed for the energization of a solenoid 402 (Figs. 23, 25 and 30) which upon being energized moves its armature 403 downwardly as shown in Fig. 23, causing the counter-clockwise swinging movement of bell crank 404 which is pivotally supported at 405. Such bell crank has engagement with a roller 406 carried on an upper arm of a lever 407 which is attached to the rotating spool 316 of pilot valve 315. A torsion spring 408 normally tends to turn the lever in the counterclockwise direction as shown in Fig. 23, thus normally maintaining the valve in the idle or zero pressure position as already referred to.

When so energized, and in response to the rocking of the lever 407 to move pilot valve 315 from its idle position to its second or full pressure position, it will be evident from the foregoing description of the hydraulic system that the pressure now is relieved only at the full or maximum pressure condition. Fluid is therefore supplied through the balanced pressure relief valve 306 to the directional control valve 330 which is spring biased to the up position, thereby providing for the introduction of fluid at full pressure beneath the head of piston 166. Such fluid introduction therefore immediately provides for the lifting of the clamp against its upper stops.

A parallel circuit is also established upon the closing of the start switch 400 for energizing a latch lock solenoid 410 which upon energization provides for the withdrawal of a latch lock pin 412 from in back of a latch member 414 having a hardened latching nose piece 415 receivable in a notched-out portion 416 of the cross-bar 160 (Figs. 8, 23, 25 and 26). The latch 414 is pivotally mounted upon a vertical shaft 418 and is normally urged into latching relation in notch 416 by means of a torsion spring 419. This operation thus results in the withdrawal of the latch lock pin concurrently with the development of full operating pressure and the application thereof in the direction to raise the clamp, thereby relieving the latch 414 of any load of the clamp in preparation for the manual actuation of the machine and the withdrawal of the latch from latching position. Normally the solenoid has sufficient force to withdraw the latch lock even in advance of the full upward pressure application and thus there need be no delay in the beginning of a working stroke and the machine is in condition to function almost immediately upon pressing the start button and moving the hand lever 110.

As soon as the latch lock 412 is raised under the action of the solenoid 410, a lever 420 (Fig. 23) is engaged by the latch lock and is moved about its pivot 421 and causes the closing of a micro-switch 422. This micro-switch establishes a parallel or holding circuit around the start switch 400, and thus as long as the latch lock pin remains in raised position, such holding circuit will be maintained.

At this point the fluid system provides full operating pressure which is applied to the clamp piston in the direction to raise the clamp, and simultaneously the latch lock has been withdrawn in preparation for a stroke of operation. The operator however must have the start switch 400 closed at the beginning of a stroke of operation as otherwise this condition will not be established, and it will not be possible to effect withdrawal of the latch.

In order to start a stroke of the machine, handle 110 is moved downwardly, after first being moved laterally to release the same from the interlocking parts 116 and 117. Such downward movement rocks shaft 111 and causes the release of brake 105 and the engagement of clutch 109, to thereby couple the drive power mechanically to the crank plate 81 to cause the knife to move through a cutting stroke. As previously described this stroke continues and at the end thereof the handle 110 is returned to its inoperative position under the operation of cam 128 and pin 123.

In addition, the rocking of shaft 111 effects the lifting of an arm 425 (Fig. 25) fixed thereto through which slidably extends a tension rod 426 having a head 427 thereon. Such rocking movement therefore lifts against head 427 and raises the rod 426, the lower end of which is connected to one arm 430 of a lever pivotally supported on the frame at 431, thereby rocking such lever in a counter-clockwise direction as shown in Fig. 25.

In order to interlock the cutting operation with the movement of the back gage, a mechanism is provided which prevents operation of the back gage during a cutting stroke or during any operation of the clamp. For this purpose an interlocking rod 434 is pivotally secured to arm 430 as shown at 435. At its upper end it carries a pin 436 pivotally connected thereto as shown at 437 which is slidably received in a housing 438 through which the back gage control rod 248 extends. As shown in Fig. 28, rod 248 has a notched-out portion 439. The parts are shown in the free position in Fig. 25 from which it will be evident that when the clamp and knife are not operating, pin 436 is withdrawn below the notch 439 and thus movement of the back gage control rod 248 is permitted as desired in response to movement of hand lever 243. However when a cycle of the machine is in progress, pin 436 is moved upwardly into the interference position shown in Fig. 28, in which position any movement of control rod 248 away from its neutral position is prevented. Thus no operation of the back gage is permitted at any time that either the clamp or knife is in motion, and the converse situation is likewise true, namely, that the pin 436 cannot be moved upwardly except when the back gage control rod 248 is in the neutral position so that when the back gage is in motion, any operation of the clamp or knife is positively prevented.

A second arm 440 of the lever 430 extends downwardly and has an abutment piece 441 which is adapted to engage the face of the latch 414 in such direction that the counter-clockwise rotation of the lever 430 will move the latch away from its latching position in the notch 416 of the tie-rod 160. This is rendered relatively easy because of the fact that the weight of the clamp is supported by the fluid pressure system and is withdrawn from the latch member itself which can thus be moved freely, the latch lock 412 having previously been withdrawn as already described.

When the latch member 414 is moved to the dotted line position shown in Fig. 26 the latch lock pin 412 will then be maintained in its raised position by engagement with the top face of latch 414 on which it rides as long as the latch is in its clearance or dotted line position and from this point on the operator does not need to continue to hold the start button 400 in closed position. Thus the maintaining of the latch pin 412 in raised position provides through the action of lever 420 for maintaining micro-switch 422 in closed position and thus the holding circuit around the start button is continued, without requiring further holding thereof by the operator.

The third arm 450 of lever 430 has a slot which receives a pin 451 carried by a rod 452 which extends from the front to the rear of the machine where it connects through pin 453 with a lever 454 pivotally mounted at 455. Such lever engages a roller 456 which is attached to an operating member 457 which has a tongue 458 adapted to engage a roller 459 carried on a lower arm of lever 407 of the pilot valve 315 in opposite relation to roller 406. Operation of lever arm 450 therefore provides for rotation of the movable spool of the pilot valve 315 from the blocked or full pressure position to the adjustable pressure position illustrated in Fig. 20, providing for development of a fluid pressure in the hydraulic system as determined by the setting of the manual control 325.

Operating member 457 has a pin 460 at the end thereof which has contacting engagement with a member 462 secured to the stem 336 of the directional valve 330. Thus movement of operating member 457 to the left as viewed in Fig. 23 provides for transmitting a similar motion to the valve stem 336, shifting the directional valve from its normally biased up position to its down position. Fluid is then supplied in the manner already described to the upper side of piston 166, the piston however moving downwardly at a rapid and controlled rate, in excess of the rate at which fluid is supplied through the pressure system. When however the clamp actually engages the work, fluid at a predetermined pressure is introduced into the cylinder to develop a proper clamping pressure upon the work.

Operating member 457 may move to the right as viewed in Fig. 23 and is connected to a slide bar 470 which is mounted for axial sliding movement in a fixed bracket 471, bar 470 carries a roller 472 at its end, such roller having an interlocking relationship with cam 473 carried on the main shaft 82 which operates the crank plate 81. Cam 473 has a notched-out portion 474 (Fig. 23) into which the roller 472 extends when the system is in its normal or inoperative position. With the system functioning properly the operating member 457 and roller 472 move out of the way of the cam 473 at the beginning of the working stroke and remain in a clearance position with respect thereto during the entire stroke, and there is therefore normally no actual engagement between roller 472 and cam 473. This construction serves a useful purpose however when it becomes necessary to jog the knife, i. e., to interrupt its downward cutting motion part way through the stroke, an operation which is sometimes desired in the cutting of sheet material. The jogging control of the knife is effected by the operation of hand lever 110, the raising of which causes the stopping of the knife as above described. In such jogging operation however it is desirable to keep the clamp in clamping relation with the work material. This is accomplished with the present device through the engagement of the raised portion of the cam 473 with roller 472 which maintains member 457 substantially in its left-hand position where the directional valve 330 is actuated to its down position to retain the clamp in clamping engagement and where the pilot valve 315 is in its variable pressure position such that the proper operating pressure is maintained upon the clamp. It will be evident therefore that there is no change in the hydraulic system as the result of this jogging operation of the knife, and the clamp will be maintained in clamping engagement throughout the jogging movements, and until the stroke of the knife has been completed.

The clamp having been lowered and engaged with the work material with a predetermined pressure at the beginning of the working stroke, and in advance of the actual contact with the knife with the work material, that pressure is maintained until after the completion of the cutting stroke and until the knife has been returned to its raised position substantially at the end of its return stroke. When this occurs, the operating handle 110 is raised in the manner already described through the camming action of cam 128 and pin 123. When this occurs the lever 430 is restored to its normal position as illustrated in Fig. 25. This results in withdrawal of interlocking pin 436 from the notch 439 in the back gage control rod 248. It also results in withdrawal of the abutment 441 from the nose of the latch member 414 which is thus allowed to return toward its latching position under the action of its torsion spring 419. However the latch rides against the side of the tie bar and does not actually engage in the notch 416 until the clamp and hence the tie bar 160 have been fully restored to their normal raised positions; thus the latch lock 412 remains in its raised position, riding on the upper surface of the latch 414, and maintaining the holding circuit through micro-switch 422.

Still further, the return of lever arm 450 causes the withdrawal of arm 454 from roller 456, and operating member 457 is then permitted to travel to the right as shown in Fig. 23 which travel occurs under the action of torsion spring 408 of the pilot valve 315 and biasing spring 338 of valve 330. Pilot valve 315 returns from its adjustable pressure position back toward its blocked or full pressure position, where it is held by reason of the engagement of roller 406 with arm 404 which remains in actuated position. Simultaneously the stem 336 of the directional valve 330 moves under its own biasing spring 338 toward the right as viewed in Fig. 23, changing the direction of application of fluid and supplying the same in the direction to cause the raising of the clamp. As a result, the fluid at full pressure is supplied in the direction to cause the raising of the clamp, with the result that the clamp lifts rapidly at the end of the stroke, and when it reaches its fully raised position, the latch member 414 moves into its original latching position in notch 416 of the tie bar. Simultaneously the latch pin 412 drops behind the latch thus locking the latch in its holding position, and simultaneously opening the holding circuit through micro-switch 422. Upon opening of this circuit solenoid 402 is deenergized, and a spring withdraws armature 403 allowing the rotatabe spool of the pilot valve 315 to be returned from the full pressure to the zero pressure position, removing all fluid load from the system.

It is also desirable to provide for operation of the clamp independently of the operation of the knife, making possible the lowering of the clamp into clamping relation, and the raising thereof by continuous manual control. In some cases, particularly in the handling of relatively loose or fluffy paper, it is highly desirable to provide for the careful lowering of the clamp into clamping relation in advance of the knife operation, and with the clamp in full clamping position, compressing the sheets and eliminating air pockets therein, to then cause the cutting stroke of the knife to take place without intermediate pressure release. For this purpose a foot treadle 480 is provided which extends along substantially the entire face of the machine immediately adjacent the floor level, such treadle being pivotally mounted on shaft 481 suitably supported in bearings 482 supported on the base 10. A torsion spring 483 acts in the direction to normally urge the treadle into raised or inoperative position, upward travel of the treadle being limited by a stop member 484.

A rod 485 is pivotally connected to the treadle at 486 by means of arm 487 secured to shaft 481, and is arranged to be raised in response to the lowering of the treadle. The rod carries collar 488 which is adapted to engage the lower side of lever arm 430 (Fig. 25), the rod travelling freely through an aperture in the lever which thus provides for guiding the rod during its movement.

From this construction it will be understood that downward movement of the treadle will be transmitted into a counter-clockwise motion of lever 430 which will establish the same results in the fluid system as previously described. It will also be clear that such movement of lever arm 430 will cause an upward travel of rod 426 but this rod will merely move freely through arm 425 without effecting any actuation of the lever 110, so that the knife will not be placed in operation. In all other respects, however, the system will function as above described, the control of travel of the clamp being in direct response to the extent of movement of treadle 480.

Thus with the treadle 480 in raised position, and having pressed the start button 400, the full operating pressure is developed and the directional control valve is set to supply fluid in the direction to raise the clamp, as previously described. As the treadle is lowered, the latch 414 is withdrawn and the directional valve 330 is operated in the direction to supply fluid above piston 360. Simultaneously the pilot valve 315 moves to its intermediate or adjustable pressure position and thus the clamp is lowered and a predetermined desired pressure established thereupon. Accurate control of the clamp movement is possible by manipulation of the treadle 480, a slight lifting thereof reversing the directional valve and supplying operating pressure in the direction to lift the clamp while movement of the treadle to a center or neutral position holds the directional valve in its neutral position where supply of fluid to both sides of the piston is blocked and the clamp can be held stationary at any intermediate position. Immediately upon full release of the treadle the directional valve returns to its normally up position, full fluid pressure is applied to the lower side of the piston and the clamp moves rapidly to its fully raised position in which the latch reengages, opening the holding circuit and thereupon removing all operating pressure from the system. It will also be evident that during any operation of the clamp under the control of the foot treadle, the same interlocking action between the clamp and the back gauge is provided by the cooperative relationship of pin 436 and slot 439 as described above. At any point in the cycle when it is desired to effect a cutting operation, it is only necessary to lower the handle 110, whereupon the complete clamping and cutting cycle will be completed in the manner already described.

In order to provide for development of full operating pressure in the system during the time that the back gauge is operated, the closing of micro-switch 283 establishes a parallel circuit for the energization of solenoid 402, so that in response to movement of hand lever 243 away from its neutral position, such solenoid 402 is energized and lever 404 is actuated to adjust the pilot valve from its zero pressure position to its blocked or full pressure position in which the system supplies full hydraulic pressure for the operation of the back gauge motor in either direction. Upon return of the hand lever 243 to neutral, the circuit is opened and solenoid 402 is then deenergized allowing return of the pilot valve to zero pressure position thus withdrawing any load from the system.

The invention therefore provides a highly satisfactory cutting mechanism in which the mechanical operation of the cutting knife is provided through connections which maintain the operating forces in a vertical plane and such as to develop uniform cutting action with reduced wear. The hydraulic system is such that it does not impose heavy loads upon the drive source during the time that the cutting stroke is being made, and thus further economy of drive power is made possible. The hydraulic mechanism is at all time under the accurate control of the operator and functions to develop and apply fluid continuously at proper pressures to carry out the operations desired. The machine is fully protected and the various operating parts interlocked and correlated with each other so that improper or dangerous operation is prevented throughout. The entire mechanism is rapid and accurate, as well as being safe, and thus contributes substantially to the successful and efficient cutting operation and the performance of a high quality of work.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a cutting machine, the combination of a supporting frame, a cutting table mounted on said frame for receiving the work material to be cut, a knife bar adapted to receive a knife therein and movable therewith for reciprocating travel relative to said table, a pair of levers at opposite sides of said frame in substantially the plane of said knife bar, each said lever having a plurality of arms of different lengths, links in said same plane directly connecting respectively between opposite ends of said knife bar and said levers at different distances from the respective pivot points thereof to actuate said knife bar, a fixed guide for one end of said knife bar to cause said bar to travel in a predetermined inclined path as it is actuated to produce a double shearing action, a connecting rod directly connected to an arm of one of said levers for operation thereof, a tie bar connected to other arms of both said levers and subject to tension during the cutting stroke for operating the other of said levers, and a crank for driving said connecting rod, said connecting rod and said tie bar also being substantially in said same plane.

2. In a cutting machine, the combination of a supporting frame, a cutting table mounted on said frame for receiving the work material to be cut, a knife bar adapted to receive a knife therein and movable therewith for reciprocating travel relative to said table, a pair of levers in substantially the plane of said knife bar, each said lever having a plurality of arms of different lengths, links in said same plane directly connecting respectively between opposite ends of said knife bar and said levers at different distances from the respective pivot points thereof to actuate said knife bar, the end of said knife bar supported by said shorter lever arm being at a higher level in the raised position of said knife than the opposite end thereof, a fixed guide for one end of said knife bar to cause said bar to travel in a predetermined inclined path as it is actuated to produce a double shearing action, a connecting rod directly connected to an arm of one of said levers for operation thereof while under tension, a tie bar connected to other arms of both said levers and subject to tension during the cutting stroke for operating the other of said levers, a crank for driving said connecting rod, said crank, said connecting rod and said tie bar all being located substantially in said plane of movement.

3. In a cutting machine, the combination of a supporting frame, a cutting table mounted on said frame for receiving the work material to be cut and having a cutting stick thereon, a knife bar guided for reciprocating travel relative to said table, a cutting knife having its cutting edge below the lower side of said knife bar and adapted to be carried down to a final position parallel to and against said cutting stick, said knife bar having arms projecting downwardly at its opposite ends to a position adjacent the cutting edge of said knife, a pair of levers having arms of different length and mounted on said frame at different elevations for rocking movement in substantially the plane of movement of said knife bar, means of different length directly connecting said levers to said arms respectively substantially opposite the cutting edge of said knife with the longer link being connected to the longer lever arm and providing for movement of said knife from a raised position with the ends thereof at different elevations to said final position against said cutting stick, and drive means also located substantially in said plane and subject to tension for actuating said levers in unison to effect a cycle of reciprocating movement of said knife.

4. In a cutting machine having a cutting table for receiving the work material thereon and a knife reciprocable with respect to said table in a cycle including a cutting stroke and a return stroke, the combination of a clamp for clamping the work material on said table, means for actuating said clamp from a raised inoperative to a lowered operative position in engagement with the work material and back to said raised position including a double acting hydraulic power unit located substantially in the plane of said clamp and within the vertical projection thereof, means for developing a predetermined hydraulic pressure on said clamp in its position to clamp the work material, means for supplying hydraulic fluid to said unit at a predetermined rate to raise said clamp to its inoperative position, and connections from said power unit to both ends of said clamp, said connections also being located substantially in the plane of movement of said clamp to avoid lateral thrust thereon in operation.

5. In a cutting machine having a cutting table for receiving work material thereon and a knife reciprocable relative thereto, the combination of a clamp for clamping the work material on said table, a source of fluid pressure, hydraulic means supplied with fluid from said source for effecting the movement of said clamp away from said table to an inoperative position, means for regulating the discharge of fluid from said hydraulic means to control the rate of movement of said clamp into its operative position in engagement with the work material on said table, and additional hydraulic means supplied with fluid from said source for developing a clamping pressure upon said clamp when in engagement with the work material on said table.

6. In a cutting machine having a cutting table for receiving work material thereon and a knife reciprocable relative thereto, the combination of a clamp movable under the action of gravity from a raised inoperative position to a lowered operative position in engagement with the work material on said table, a source of fluid pressure, hydraulic means supplied with fluid from said source for effecting the raising of said clamp to its said inoperative position, valve means for regulating the discharge of fluid from said hydraulic means to control the rate of descent of said clamp under the action of gravity, and additional hydraulic means supplied with fluid from said source for developing a downward clamping pressure on the clamp when in engagement with the work material on said table.

7. In a cutting mechanism, the combination of a work table adapted to receive work material thereon, a clamp movable from an inoperative position to an operative position in engagement with the work material on said table, a fluid reservoir, means for subjecting fluid from said reservoir to pressure to establish a pressure source, hydraulic means including piston and cylinder members for developing a force to cause the actuation of said clamp, means for introducing fluid from said pressure source to said hydraulic means at a relatively low rate of flow to effect pressure application of said clamp, and auxiliary means for supplying fluid directly from said reservoir to said hydraulic means at a substantially greater rate to allow an increased rate of travel of said clamp prior to engagement thereof with the work material.

8. In a cutting mechanism, the combination of a work table adapted to receive work material thereon, a clamp movable from an inoperative position to an operative position in engagement with the work material on said table, a fluid reservoir, means for subjecting fluid from said reservoir to pressure to establish a pressure source, hydraulic means including piston and cylinder members for developing a force to cause the actuation of said clamp, means for introducing fluid from said pressure source to said hydraulic means at a relatively low rate of flow to effect pressure application of said clamp, auxiliary means for supplying fluid directly from said reservoir to said hydraulic means at a substantially greater rate during the travel of said clamp prior to engagement thereof with the work material, and means to close said auxiliary supply when pressure fluid is supplied from said source to establish a clamping pressure on said clamp.

9. In a cutting mechanism, the combination of a work table adapted to receive work material thereon, a clamp movable from a raised inoperative position to a lowered operative position in engagement with the work material on said table, a fluid reservoir, means for subjecting fluid from said reservoir to pressure to establish a pressure source, hydraulic means including piston and cylinder members for developing a force to cause the actuation of said clamp, means for introducing fluid from said pressure source to said hydraulic means at a relatively low rate of flow to effect pressure application of said clamp, auxiliary means for supplying fluid directly from said reservoir to said hydraulic means at a substantially greater rate to allow an increased rate of downward travel of the clamp, means to close said auxiliary supply when clamping pressure is established in said hydraulic cylinder, and means for introducing fluid from said pressure source to said hydraulic means to effect the raising of said clamp.

10. In a cutting mechanism, the combination of a work table adapted to receive work material thereon, a clamp movable from a raised inoperative position to a lowered operative position in engagement with the work material on said table, a fluid reservoir, means for subjecting fluid from said reservoir to pressure to establish a pressure source, hydraulic means including piston and cylinder members of relatively large area for developing a force to cause the downward pressure application of said clamp and of relatively small area for developing a force to raise said clamp, means for introducing fluid from said pressure source to said hydraulic cylinder of small area to effect the raising of said clamp, means for introducing fluid from said pressure source to said hydraulic cylinder of large area at a relatively low rate to effect pressure application of said clamp, and auxiliary means for supplying fluid from said reservoir to said cylinder of large area at a rapid rate during the lowering of said clamp.

11. In a cutting mechanism, the combination of a work table adapted to receive work material thereon, a clamp movable under the action of gravity from a raised inoperative position to a lowered operative position in engagement with the work material, a fluid reservoir, means for subjecting fluid from said reservoir to pressure to form a pressure source, hydraulic means for actuating said clamp, means for introducing fluid from said pressure source to said hydraulic means at a relatively slow rate to develop a downward clamping pressure, and additional means operable during the lowering of said clamp for introducing fluid to said hydraulic means at a substantially increased rate to maintain said hydraulic means filled with fluid and capable of immediate development of a clamping pressure upon supply of fluid from said fluid introducing means when the clamp is in engagement with the work material.

12. In a cutting mechanism, the combination of a work table adapted to receive work material thereon, a clamp movable from a raised inoperative position to a lowered operative position in engagement with the work material on said table, a fluid reservoir, means for subjecting fluid from said reservoir to pressure to establish a pressure source, hydraulic means including piston and cylinder members of relatively large area for developing a force to cause the downward pressure application of said clamp and of relatively small area for developing a force to raise said clamp, means for introducing fluid from said pressure source to said hydraulic cylinder of small area to effect the raising of said clamp, means for introducing fluid from said pressure source to said hydraulic cylinder of large area at a relatively low rate to effect pressure application of said clamp, and auxiliary means for supplying fluid from said reservoir to said cylinder of large area at a rapid rate during the lowering of said clamp to maintain said large area cylinder filled with fluid, and means for regulating the discharge of fluid from said hydraulic cylinder of small area to control the rate of descent of said clamp.

13. In a cutting mechanism, the combination of a work table adapted to receive work material thereon, a clamp movable from a raised inoperative position to a lowered operative position in clamping engagement with said work material, hydraulic means for effecting the raising and lowering of said clamp including a fluid reservoir, means for subjecting fluid from said reservoir to pressure, an actuating cylinder, a double acting piston in said cylinder having a large area on one side and a relatively small area on the other side, means for introducing fluid from said pressure source to said large area side of said piston to supply fluid thereto for the downward pressure application of the clamp, auxiliary means for supplying additional fluid directly from said reservoir to said large area side of said piston to increase the rate of downward travel of the clamp, means preventing reverse flow of fluid through said auxiliary passage to provide for development of a high pressure on said clamp when in engagement with the work material, and means for introducing fluid from said pressure source to said small area side of said piston to effect the raising of said clamp to its inoperative position.

14. In a cutting machine having a cutting table for receiving the work material thereon, and a knife reciprocable with respect to said table in a cycle including a cutting stroke and a return stroke, the combination of a clamp for clamping the work material on said table, hydraulic means for actuating said clamp from a raised to an operative position in engagement with the work material, and control means for said hydraulic means operable in correlated relation with said cycle of the knife including valve means for establishing an adjustable pressure for engaging said clamp with said work material with a predetermined force, and additional valve means for establishing a limiting high pressure during return of said clamp to its raised position after the knife has completed its cutting stroke.

15. In a cutting machine, the combination of a cutting table for receiving the work material thereon, a knife reciprocable with respect to said table, mechanical connections for reciprocating said knife through a cycle of movement including a cutting stroke and a return stroke, a clamp for clamping the work material on said table, hydraulic means for actuating said clamp, and means for controlling the actuation of said clamp in coordinated relation with the cycle of operation of said knife to establish and maintain a predetermined clamping pressure upon the work material from prior to the actual cutting of the work material by said knife until after the completion thereof.

16. A cutting mechanism of the character described comprising a work table, a cutting knife reciprocable with respect to said table to cut the work material thereon, a clamp movable from a raised inoperative position to a lowered operative position in engagement with said work material, hydraulic means for effecting the raising and lowering of said clamp, means for adjusting the pressure developed by said hydraulic means, and control means for said pressure adjusting means providing for establishment of full pressure in the direction for lifting said clamp in advance of the working stroke of the knife.

17. A cutting mechanism of the character described comprising a work table, a cutting knife reciprocable in a working stroke to cut the work material on said table, a clamp movable from a raised inoperative position to a lowered operative position in engagement with said work material, hydraulic means for effecting the raising and lowering of said clamp, means for adjusting the pressure developed by said hydraulic means, control means for said pressure adjusting means providing for establishment of full pressure in the direction for lifting said clamp in advance of the working stroke, and means for establishing a predetermined adjustable pressure in the opposite direction during the time the clamp is in contact with the work material.

18. A cutting mechanism of the character described comprising a work table, a cutting knife reciprocable in an operating cycle including a cutting and a return stroke with respect to said table to cut the work material thereon, a clamp movable from a raised inoperative position to a lowered operative position in engagement with said work material, hydraulic means for effecting both the raising and lowering of said clamp, means for adjusting the pressure developed by said hydraulic means and applied to said clamp, control means for said pressure adjusting means to establish a predetermined adjustable pressure condition when said clamp is lowered to its operative position in engagement with said work material, and means for establishing a limiting high pressure of said hydraulic means after the end of said cutting of said knife to provide for return of said clamp to its raised inoperative position.

19. A cutting mechanism of the character described comprising a work table adapted to receive work material thereon, a cutting knife reciprocable in a working stroke to cut the material on said table, a clamp movable from a raised inoperative position to a lowered operative position in engagement with the work material on said table, hydraulic means for effecting the raising and lowering of said clamp, means for latching said clamp in its raised inoperative position, and means under manual control for effecting withdrawal of said latch from said clamp at the beginning of a working stroke to provide for lowering movement of said clamp.

20. In a cutting mechanism, the combination of a work table adapted to receive work material thereon, a cutting knife reciprocable relative thereto to cut the work material on said table, a clamp movable from a raised inoperative position to a lowered operative position in engagement with the work material on said table, a fluid supply, power operated means for subjecting said fluid to pressure, adjustable valve means for establishing a predetermined pressure in the fluid supplied from said source, hydraulic means for effecting the raising and lowering of said clamp, means for latching said clamp in its raised inoperative position, means for effecting withdrawal of said latch from said clamp to allow the lowering thereof, and means effective upon movement of said latch to its latching position following return of said clamp to its raised inoperative position for adjusting said valve means to release the pressure from said pressure source.

21. A cutting machine of the character described comprising a cutting table adapted to receive work material thereon, a clamp movable from an inoperative raised position to a lowered operative position in engagement with the work material on said table, a cutting knife, means for moving said cutting knife through a reciprocating stroke of movement to cut the material on said work table, a manual control for initiating the operation of said knife on its cutting stroke, power actuating means for operating said clamp into its clamping position, a latch for normally retaining said clamp in its raised inoperative position, means for withdrawing said latch from said clamp at the beginning of the cutting stroke to provide for operation of said clamp under its power actuating means, a lock for locking said latch in latching position, and means requiring an additional manual movement by the operator for effecting withdrawal of said latch lock.

22. In a cutting machine, a work table for receiving the work material, a cutting knife reciprocable relative thereto, a clamp movable separately from said knife from a raised inoperative position to a lowered operative position in engagement with the work material, a back gage movable forwardly and backwardly over said table, hydraulic means for operating both said clamp and said back gage, means for establishing an adjustable fluid pressure for said hydraulic means to apply said clamp to the work material with a predetermined adjusted clamping pressure, means for establishing a limiting high pressure for said hydraulic means during withdrawal of said clamp to its said raised inoperative position, and means for also establishing said limiting high pressure for said hydraulic means during operation of said back gage.

23. In a cutting machine having a work table for receiving the work material and a cutting knife reciprocable relative thereto, the combination of a back gage, hydraulic means for moving said back gage forwardly and backwardly over said work table, control means for said hydraulic means including a directional valve, a pressure control valve providing for development of a fluid operating pressure, and means movable selectively to control said directional valve and said pressure control valve to apply fluid operating pressure to said hydraulic means to effect actuation thereof in the selected direction.

24. In a cutting machine of the character described the combination of a cutting table, a knife movable on a cutting stroke with respect to said table, a clamp movable from an inoperative raised position to a lowered operative position in engagement with the work material and into clamping relation with the material being cut on the table, a back gage for engaging the material being cut and for moving the same forwardly towards said knife, and control means for said back gage and said clamp preventing forward actuation of said back gage when said clamp is in said lowered clamping position and preventing said forward movement of said back gage except when said clamp is in its raised inoperative position.

25. In a cutting machine of the character described the combination of a cutting table, a knife movable on a cutting stroke with respect to said table, a clamp movable from an inoperative raised position to a lowered operative position in engagement with the work material and into clamping relation with the material being cut on the table, hydraulic actuating means for said clamp, a back gage for engaging the material being cut and for moving the same forwardly towards said knife, hydraulic actuating means for said back gage, and control means for said clamp and said back gage actuating means preventing simultaneous actuation of said clamp and said back gage.

26. In a cutting mechanism having a work table and a knife reciprocable relative thereto, a back gage for moving the work material forwardly toward the cutting knife, power actuated means for operating said back gage, a manually operated member movable from a neutral to a forward and a backward position for controlilng said power actuated means to effect a corresponding movement of said back gage, means for normally returning said maunal control member from its forward to its said neutral position, means for retaining said maunal control in its said backward position, and means for restoring said manual control to its said neutral position when the back gage reaches a predtermined point in its backward travel.

27. In a cutting mechanism having a work table and a knife reciprocable relative thereto, a back gage for moving the work material forwardly toward the cutting knife, hydraulic means for operating said back gage, control means for said hydraulic means movable from a neutral to a forward and a backward position to effect a corresponding movement of said back gage, biasing means tending to return said control means to its said neutral position, releasable means for retaining said control means in its said backward position, and means operated when said back gage reaches a predetermined position for effecting release of said releasable means to cause the stopping of said back gage.

28. In a cutting mechanism having a work table and a knife reciprocable relative thereto, a back gage for moving the work material forwardly toward the cutting knife, hydraulic means for operating said back gage, control means for said hydraulic means movable from a neutral to a forward and a backward position to effect a corresponding movement of said back gage, a controllable source of fluid operating pressure for said hydraulic means, and means operable in response to movement of said control means in either direction away from its said neutral position for controlling said source to establish a supply of pressure operating fluid and operable in response to return thereof to said neutral position to relieve said fluid pressure.

29. In a cutting mechanism having a work table and a knife reciprocable relative thereto, a back gage for moving the work material forwardly toward the cutting knife, a flexible tape movable with said back gage and having graduations thereon indicative of the setting of said back gage, a pair of laterally spaced guide members mounted on the forward side of said mechanism over which said flexible tape travels with the movement of said back gage, and an index mark located between said guide members and adjacent said tape providing a reading position for said tape spaced from said guide means to facilitate observation of a desired graduation on said tape in advance of its arrival at said index mark.

30. In a cutting mechanism having a work table and a knife reciprocable relative thereto, a back gage for moving the work material forwardly toward the cutting knife, manual means for actuating said back gage, hydraulic motor means for actuating said back gage, a source of fluid pressure, and control means for said hydraulic means including valve means movable away from a neutral position for regulating the supply of fluid to said hydraulic means at a controlled rate to effect movement of said back gage over a desired range of speed, said valve means being constructed to provide for passage when in said neutral position of fluid from said hydraulic means to allow for manual movement of said back gage.

31. In a cutting machine, the combination of a work table adapted to receive work material thereon, a clamp, means for developing a clamping pressure to urge said clamp into clamping engagement with the work material on said table, a cutting knife, means for operatively supporting said knife for reciprocating movement in a cutting stroke for cutting the work material on said table, control means for controlling the actuation of said knife providing for interrupting the movement of said knife during the cutting stroke to provide for jogging thereof, and means for maintaining said clamp in said clamping engagement with said work material during the interruption of said cutting stroke.

32. In a cutting machine having a cutting table for receiving work material thereon and a knife reciprocable relative thereto, the combination of a clamp for clamping the work material on said table and for gaging the cut line on said material, means providing a continuous supply of hydraulic fluid under pressure, a cylinder and piston mounted for relative movement in response to fluid pressure within said cylinder, means effective upon relative movement of said piston and cylinder to cause clamping movement of said clamping member, means forming a passage for supplying said pressure fluid from said pressure supply to said cylinder, means forming a bypass passage for said fluid bypassing said cylinder, valve means controlling the flow of said pressure fluid through said bypass to cause clamping movement of said clamp member when said bypass is closed and release thereof when said bypass is open, means for limiting the maximum pressure developed within said cylinder, and manually controllable means for actuating said valve to control the movement of said clamp.

33. In a cutting machine of the character described having a cutting table for receiving work material thereon and a knife reciprocable relative thereto, the combination of a clamp for clamping the work material on said table and for gaging the cut line on said material, power operating means for said clamp member operable independently of the operation of said machine in the cutting of work material including means providing a continuous supply of hydraulic fluid under pressure, a cylinder and piston mounted for relative movement in response to fluid pressure within said cylinder, means effective upon relative movement of said piston and cylinder to cause clamping movement of said clamping member, means forming a passage for supplying said pressure fluid from said pressure supply to said cylinder, means forming a bypass passage for said fluid bypassing said cylinder, valve means controlling the flow of said pressure fluid through said bypass to cause clamping movement of said clamp member when said bypass is closed and release thereof when said bypass is open, means for limiting the maximum pressure developed within said cylinder, and manually controllable means for actuating said valve to control the movement of said clamp.

WILLIAM R. SPILLER.
FREDERICK W. VARWIG.

REFERENCES CITED

The following references are of record in the file of this patent:

UNITED STATES PATENTS

| Number | Name | Date |
| --- | --- | --- |
| 204,715 | Crossley et al. | June 11, 1878 |
| 231,813 | Kent | Aug. 31, 1880 |
| 508,329 | Malm | Nov. 7, 1893 |
| 1,200,802 | Berry | Oct. 10, 1916 |
| 1,565,654 | Laukhoff | Dec. 15, 1925 |
| 1,569,569 | Pels | Jan. 12, 1926 |

FOREIGN PATENTS

| Number | Country | Date |
| --- | --- | --- |
| 364,581 | Germany | Nov. 28, 1922 |
| 406,441 | Great Britain | Mar. 1, 1934 |